(12) United States Patent
Terentiv et al.

(10) Patent No.: US 11,405,741 B2
(45) Date of Patent: Aug. 2, 2022

(54) METHOD AND SYSTEM FOR HANDLING GLOBAL TRANSITIONS BETWEEN LISTENING POSITIONS IN A VIRTUAL REALITY ENVIRONMENT

(71) Applicant: DOLBY INTERNATIONAL AB, Amsterdam Zuidoost (NL)

(72) Inventors: Leon Terentiv, Erlangen (DE); Christof Fersch, Neumarkt (DE); Daniel Fischer, Fuerth (DE)

(73) Assignee: Dolby International AB, Amsterdam (NL)

( * ) Notice: Subject to any disclaimer, the term of this patent is extended or adjusted under 35 U.S.C. 154(b) by 199 days.

(21) Appl. No.: 16/768,671

(22) PCT Filed: Dec. 18, 2018

(86) PCT No.: PCT/EP2018/085641
§ 371 (c)(1),
(2) Date: May 31, 2020

(87) PCT Pub. No.: WO2019/121775
PCT Pub. Date: Jun. 27, 2019

(65) Prior Publication Data
US 2021/0006924 A1    Jan. 7, 2021

Related U.S. Application Data

(60) Provisional application No. 62/599,841, filed on Dec. 18, 2017.

(30) Foreign Application Priority Data

Dec. 18, 2017    (EP) ..................................... 17208088

(51) Int. Cl.
*H04R 5/00*    (2006.01)
*H04S 7/00*    (2006.01)
(Continued)

(52) U.S. Cl.
CPC ............ *H04S 7/303* (2013.01); *G06T 19/006* (2013.01); *H04S 7/307* (2013.01)

(58) Field of Classification Search
CPC ........ H04S 7/307; H04S 7/303; G06T 19/006
(Continued)

(56) References Cited

U.S. PATENT DOCUMENTS

| 6,077,237 A | 6/2000 | Campbell |
| 9,384,741 B2 | 7/2016 | Morrell |

(Continued)

FOREIGN PATENT DOCUMENTS

| CN | 104604255 B | 5/2015 |
| CN | 106688253 A | 5/2017 |

(Continued)

OTHER PUBLICATIONS

"VR: Formats for Immersive Media" ETSI, Jan. 2017.
(Continued)

*Primary Examiner* — Ammar T Hamid

(57) ABSTRACT

A method (900) for rendering audio in a virtual reality rendering environment (180) is described. The method (900) comprises rendering (901) an origin audio signal of an origin audio source (113) of an origin audio scene (111) from an origin source position on a sphere (114) around a listening position (201) of a listener (181). Furthermore, the method (900) comprises determining (902) that the listener (181) moves from the listening position (201) within the origin audio scene (111) to a listening position (202) within a different destination audio scene (112). In addition, the method (900) comprises applying (903) a fade-out gain to the origin audio signal to determine a modified origin audio signal, and rendering (903) the modified origin audio signal (Continued)

of the origin audio source (113) from the origin source position on the sphere (114) around the listening position (201, 202).

22 Claims, 9 Drawing Sheets

(51) Int. Cl.
*G06T 19/00* (2011.01)
*H04R 5/02* (2006.01)

(58) Field of Classification Search
USPC .................................................. 381/1, 301
See application file for complete search history.

(56) References Cited

U.S. PATENT DOCUMENTS

| | | | |
|---|---|---|---|
| 9,805,726 | B2 | 10/2017 | Adami |
| 2010/0197401 | A1 | 8/2010 | Altshuler |
| 2011/0002469 | A1 | 1/2011 | Ojala |
| 2015/0302651 | A1 | 10/2015 | Shpigelman |
| 2016/0330563 | A1 | 11/2016 | Chen |
| 2017/0208417 | A1 | 7/2017 | Thakur |
| 2017/0223478 | A1 | 8/2017 | Jot |
| 2017/0236328 | A1 | 8/2017 | Eatedali |
| 2017/0295446 | A1* | 10/2017 | Thagadur Shivappa ............... H04S 7/304 |

FOREIGN PATENT DOCUMENTS

| | | |
|---|---|---|
| EP | 2332346 B1 | 6/2011 |
| EP | 3174005 A1 | 5/2017 |
| RU | 2454825 C2 | 6/2012 |
| WO | 2017087460 A1 | 5/2017 |
| WO | 20171234091 | 7/2017 |

OTHER PUBLICATIONS

Altman, M. et al "Immersive Audio for VR" AES presented at the Conference on Audio for Virtual and Augmented Reality, Sep. 30, 2016-Oct. 1, 2016, Los Angeles, CA. pp. 1-8.

Oh, Henney "The Future of VR Audio—3 Trends to Track this Year" Jul. 4, 2017.

Podkosova, I. et al "A Hybrid Sound Model for 3D Audio Games with Real Walking" Proc. of the 29th International Conference on Computer Animation and Social Agents, pp. 189-192, May 23-25, 2016.

Qualcomm, "Making Immersive Virtual Reality Possible in Mobile" Mar. 2016.

* cited by examiner

METHOD AND SYSTEM FOR HANDLING GLOBAL TRANSITIONS BETWEEN LISTENING POSITIONS IN A VIRTUAL REALITY ENVIRONMENT

CROSS-REFERENCE TO RELATED APPLICATIONS

This application claims priority of the following priority applications: US provisional application 62/599,841 (reference: D17085USP1), filed 18 Dec. 2017 and EP application 17208088.9 (reference: D17085EP), filed 18 Dec. 2017, which are hereby incorporated by reference.

TECHNICAL FIELD

The present document relates to an efficient and consistent handling of transitions between auditory viewports and/or listening positions in a virtual reality (VR) rendering environment.

BACKGROUND

Virtual reality (VR), augmented reality (AR) and mixed reality (MR) applications are rapidly evolving to include increasingly refined acoustical models of sound sources and scenes that can be enjoyed from different viewpoints/perspectives or listening positions. Two different classes of flexible audio representations may e.g. be employed for VR applications: sound-field representations and object-based representations. Sound-field representations are physically-based approaches that encode the incident wavefront at the listening position. For example, approaches such as B-format or Higher-Order Ambisonics (HOA) represent the spatial wavefront using a spherical harmonics decomposition. Object-based approaches represent a complex auditory scene as a collection of singular elements comprising an audio waveform or audio signal and associated parameters or metadata, possibly time-varying.

Enjoying the VR, AR and MR applications may include experiencing different auditory viewpoints or perspectives by the user. For example, room-based virtual reality may be provided based on a mechanism using 6 degrees of freedom (DoF). FIG. 1 illustrates an example of 6 DoF interaction which shows translational movement (forward/back, up/down and left/right) and rotational movement (pitch, yaw and roll). Unlike a 3 DoF spherical video experience that is limited to head rotations, content created for 6 DoF interaction also allows for navigation within a virtual environment (e.g., physically walking inside a room), in addition to the head rotations. This can be accomplished based on positional trackers (e.g., camera based) and orientational trackers (e.g. gyroscopes and/or accelerometers). 6 DoF tracking technology may be available on higher-end desktop VR systems (e.g., PlayStation®VR, Oculus Rift, HTC Vive) as well as on high-end mobile VR platforms (e.g., Google Tango). A user's experience of directionality and spatial extent of sound or audio sources is critical to the realism of 6 DoF experiences, particularly an experience of navigation through a scene and around virtual audio sources.

Available audio rendering systems (such as the MPEG-H 3D audio renderer) are typically limited to the rendering of 3 DoFs (i.e. rotational movement of an audio scene caused by a head movement of a listener). Translational changes of the listening position of a listener and the associated DoFs can typically not be handled by such renderers.

The present document is directed at the technical problem of providing resource efficient methods and systems for handling translational movement in the context of audio rendering.

SUMMARY

According to an aspect a method for rendering audio in a virtual reality rendering environment is described. The method comprises rendering an origin audio signal of an origin audio source of an origin audio scene from an origin source position on a sphere around a listening position of a listener. Furthermore, the method comprises determining that the listener moves from the listening position within the origin audio scene to a listening position within a different destination audio scene. In addition, the method comprises applying a fade-out gain to the origin audio signal to determine a modified origin audio signal. The method further comprises rendering the modified origin audio signal of the origin audio source from the origin source position on the sphere around the listening position.

According to a further aspect, a virtual reality audio renderer for rendering audio in a virtual reality rendering environment is described. The virtual reality audio renderer is configured to render an origin audio signal of an origin audio source of an origin audio scene from an origin source position on a sphere around a listening position of a listener. In addition, the virtual reality audio renderer is configured to determine that the listener moves from the listening position within the origin audio scene to a listening position within a different destination audio scene. Furthermore, the virtual reality audio renderer is configured to apply a fade-out gain to the origin audio signal to determine a modified origin audio signal, and to render the modified origin audio signal of the origin audio source from the origin source position on the sphere around the listening position.

According to a further aspect, a method for generating a bitstream indicative of an audio signal to be rendered within a virtual reality rendering environment is described. The method comprises: determining an origin audio signal of an origin audio source of an origin audio scene; determining origin position data regarding an origin source position of the origin audio source; generating a bitstream comprising the origin audio signal and the origin position data; receiving an indication that a listener moves from the origin audio scene to a destination audio scene within the virtual reality rendering environment; determining a destination audio signal of a destination audio source of the destination audio scene; determining destination position data regarding a destination source position of the destination audio source; and generating a bitstream comprising the destination audio signal and the destination position data.

According to another aspect, an encoder configured to generate a bitstream indicative of an audio signal to be rendered within a virtual reality rendering environment is described. The encoder is configured to: determine an origin audio signal of an origin audio source of an origin audio scene; determine origin position data regarding an origin source position of the origin audio source; generate a bitstream comprising the origin audio signal and the origin position data; receive an indication that a listener moves from the origin audio scene to a destination audio scene within the virtual reality rendering environment; determine a destination audio signal of a destination audio source of the destination audio scene; determine destination position data regarding a destination source position of the destination audio source; and generate a bitstream comprising the destination audio signal and the destination position data.

According to a further aspect, a virtual reality audio renderer for rendering an audio signal in a virtual reality rendering environment is described. The audio renderer comprises a 3D audio renderer which is configured to render an audio signal of an audio source from a source position on a sphere around a listening position of a listener within the virtual reality rendering environment. Furthermore, the virtual reality audio renderer comprises a pre-processing unit which is configured to determine a new listening position of the listener within the virtual reality rendering environment. Furthermore, the pre-processing unit is configured to update the audio signal and the source position of the audio source with respect to a sphere around the new listening position. The 3D audio renderer is configured to render the updated audio signal of the audio source from the updated source position on the sphere around the new listening position.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1a shows an example audio processing system for providing 6 DoF audio;

DETAILED DESCRIPTION

Figure 1A:
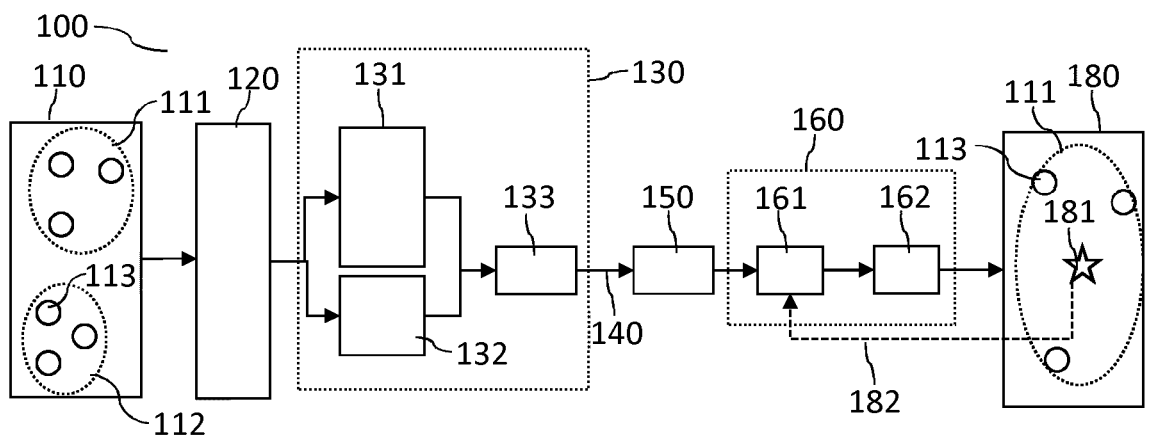
FIG. 1b shows example situations within a 6 DoF audio and/or rendering environment.
FIG. 1c shows an example transition from an origin audio scene to a destination audio scene.

As outlined above, the present document relates to the efficient provision of 6 DoF in a 3D (three dimensional) audio environment. FIG. 1a illustrates a block diagram of an example audio processing system 100. An acoustic environment 110 such as a stadium may comprise various different audio sources 113. Example audio sources 113 within a stadium are individual spectators, a stadium speaker, the players on the field, etc. The acoustic environment 110 may be subdivided into different audio scenes 111, 112. By way of example, a first audio scene 111 may correspond to the home team supporting block and a second audio scene 112 may correspond to the guest team supporting block. Depending on where a listener is positioned within the audio environment, the listener will either perceive audio sources 113 from the first audio scene 111 or audio sources 113 from the second audio scene 112.

The different audio sources 113 of an audio environment 110 may be captured using audio sensors 120, notably using microphone arrays. In particular, the one or more audio scenes 111, 112 of an audio environment 110 may be described using multi-channel audio signals, one or more audio objects and/or higher order ambisonic (HOA) signals. In the following, it is assumed that an audio source 113 is associated with audio data that is captured by the audio sensors 120, wherein the audio data indicates an audio signal and the position of the audio source 113 as a function of time (at a particular sampling rate of e.g. 20 ms).

A 3D audio renderer, such as the MPEG-H 3D audio renderer, typically assumes that a listener is positioned at a particular listening position within an audio scene 111, 112. The audio data for the different audio sources 113 of an audio scene 111, 112 is typically provided under the assumption that the listener is positioned at this particular listening position. An audio encoder 130 may comprise a 3D audio encoder 131 which is configured to encode the audio data of the audio sources 113 of the one or more audio scenes 111, 112.

Furthermore, VR (virtual reality) metadata may be provided, which enables a listener to change the listening position within an audio scene 111, 112 and/or to move between different audio scenes 111, 112. The encoder 130 may comprise a metadata encoder 132 which is configured to encode the VR metadata. The encoded VR metadata and the encoded audio data of the audio sources 113 may be combined in combination unit 133 to provide a bitstream 140 which is indicative of the audio data and the VR metadata. The VR metadata may e.g. comprise environmental data describing the acoustic properties of an audio environment 110.

The bitstream 140 may be decoded using a decoder 150 to provide the (decoded) audio data and the (decoded) VR metadata. An audio renderer 160 for rendering audio within a rendering environment 180 which allows 6 DoFs may comprise a pre-processing unit 161 and a (conventional) 3D audio renderer 162 (such as MPEG-H 3D audio). The pre-processing unit 161 may be configured to determine the listening position 182 of a listener 181 within the listening environment 180. The listening position 182 may indicate the audio scene 111 within which the listener 181 is positioned. Furthermore, the listening position 182 may indicate the exact position within an audio scene 111. The pre-processing unit 161 may further be configured to determine a 3D audio signal for the current listening position 182 based on the (decoded) audio data and possibly based on the (decoded) VR metadata. The 3D audio signal may then be rendered using the 3D audio renderer 162.

It should be noted that the concepts and schemes, which are described in the present document may be specified in a frequency-variant manner, may be defined either globally or in an object/media-dependent manner, may be applied directly in spectral or time domain and/or may be hardcoded into the VR renderer 160 or may be specified via a corresponding input interface.

Figure 1B:
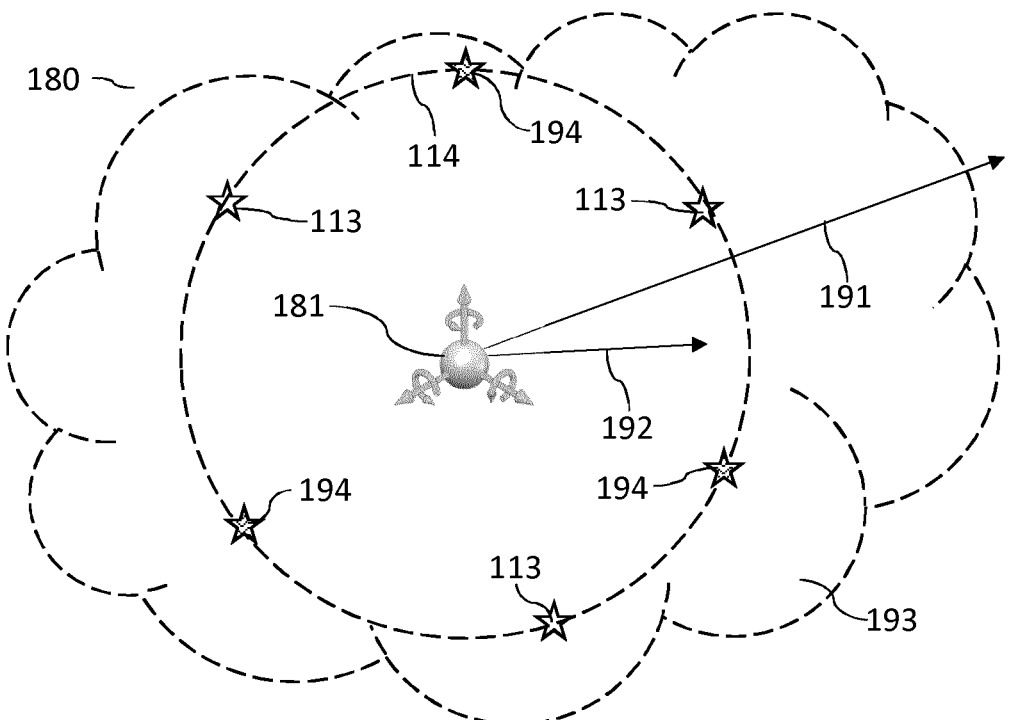

FIG. 1b shows an example rendering environment 180. The listener 181 may be positioned within an origin audio scene 111. For rendering purposes, it may be assumed that the audio sources 113, 194 are placed at different rendering positions on a (unity) sphere 114 around the listener 181. The rendering positions of the different audio sources 113, 194 may change over time (according to a given sampling rate). Different situations may occur within a VR rendering environment 180: The listener 181 may perform a global transition 191 from the origin audio scene 111 to a destination audio scene 112. Alternatively or in addition, the listener 181 may perform a local transition 192 to a different listening position 182 within the same audio scene 111. Alternatively or in addition, an audio scene 111 may exhibit environmental, acoustically relevant, properties (such as a wall), which may be described using environmental data 193 and which should be taken into account, when a change of the listening position 182 occurs. Alternatively or in addition, an audio scene 111 may comprise one or more ambience audio sources 194 (e.g. for background noise) which should be taken into account, when a change of the listening position 182 occurs.

Figure 1C:
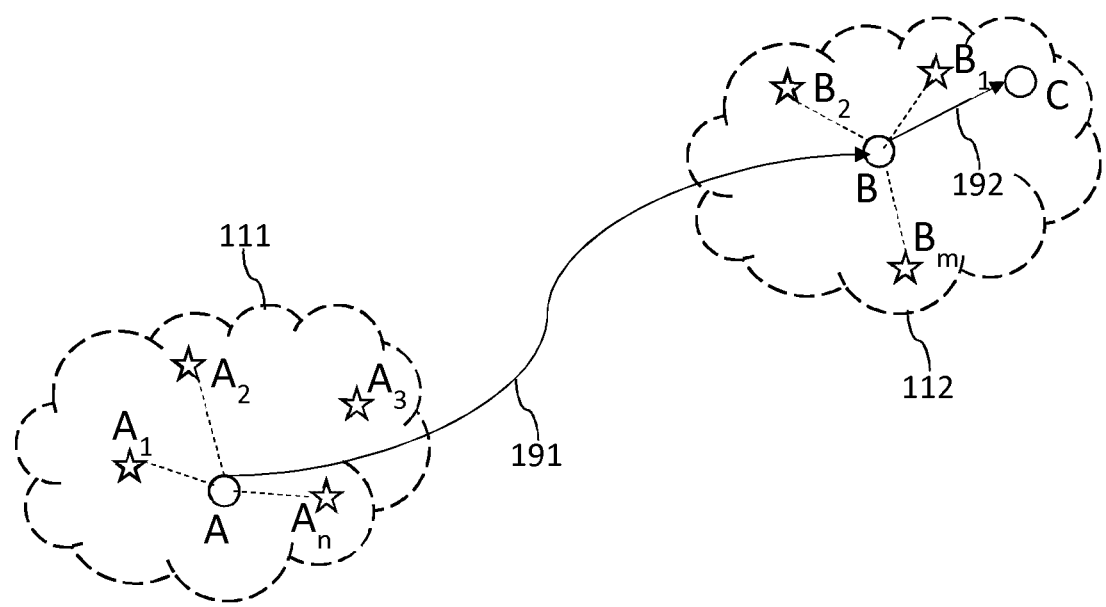

FIG. 1c shows an example global transition 191 from an origin audio scene 111 with the audio sources 113 $A_1$ to $A_n$ to a destination audio scene 112 with the audio sources 113 $B_1$ to $B_m$. Notably, each audio source 113 may be included in only one of the origin audio scene 111 and the destination audio scene 112, e.g., audio sources 113 $A_1$ to $A_n$ are included in the origin audio scene 111 but not in the destination audio scene 112, whereas audio sources 113 $B_1$ to $B_m$ are included in the destination audio scene 112 but not in the origin audio scene 111.

An audio source 113 may be characterized by the corresponding inter-location object properties (coordinates, directivity, distance sound attenuation function, etc.). The global transition 191 may be performed within a certain transition time interval (e.g. in the range of 5 seconds, 1 second, or less). The listening position 182 within the origin scene 111, at the beginning of the global transition 191, is marked with "A". Furthermore, the listening position 182 within the destination scene 112, at the end of the global transition 191, is marked with "B". Furthermore, FIG. 1c illustrates a local transition 192 within the destination scene 112 between the listening position "B" and the listening position "C".

Figure 2:
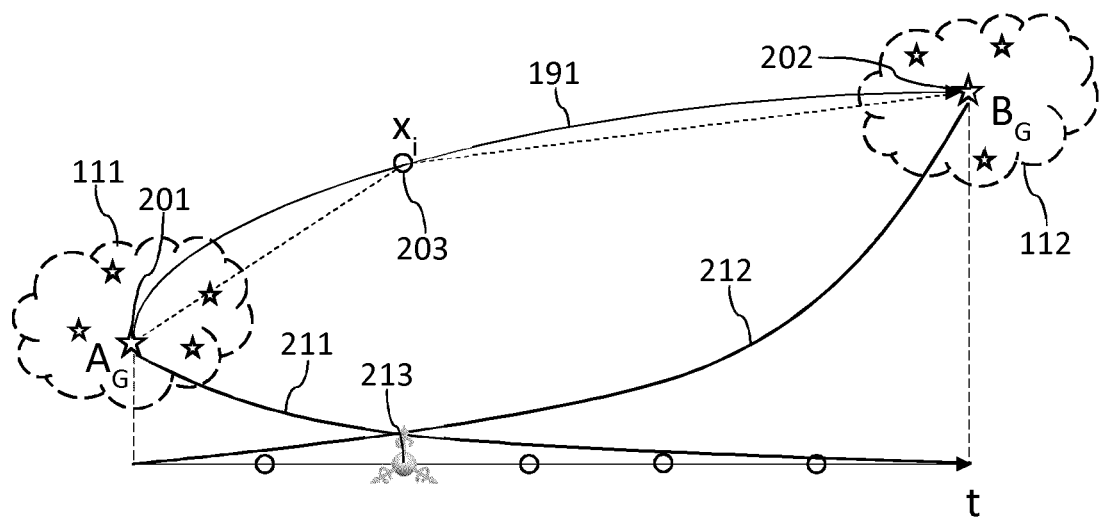
FIG. 2 illustrates an example scheme for determining spatial audio signals during a transition between different audio scenes.

FIG. 2 shows the global transition 191 from the origin scene 111 (or origin viewport) to the destination scene 112 (or destination viewport) during the transition time interval t. Such a transition 191 may occur when a listener 181 switches between different scenes or viewports 111, 112, e.g. within a stadium. As such, the global transition 191 from the origin scene 111 to the destination scene 112 does not need to correspond to actual physical movement of the listener 181, but can simply be initiated by the listener's command to switch or transition to another viewport 111, 112. Notwithstanding, the present disclosure makes reference to a position of the listener, which is understood to be a position of the listener in the VR/AR/MR environment.

At an intermediate time instant 213 the listener 181 may be positioned at an intermediate position between the origin scene 111 and the destination scene 112. The 3D audio signal 203 which is to be rendered at the intermediate position and/or at the intermediate time instant 213 may be determined by determining the contribution of each of the audio sources 113 $A_1$ to $A_n$ of the origin scene 111 and of each of the audio sources 113 $B_1$ to $B_m$ of the destination scene 112, while taking into account the sound propagation of each audio source 113. This, however, would be linked with a relatively high computational complexity (notably in case of a relatively high number of audio sources 113).

At the beginning of the global transition 191, the listener 181 may be positioned at the origin listening position 201. During the entire transition 191, a 3D origin audio signal AG may be generated with respect to the origin listening position 201, wherein the origin audio signal only depends on the audio sources 113 of the origin scene 111 (and does not depend on the audio sources 113 of the destination scene 112). The global transition 191 does not affect the apparent source positions of the audio sources 113 of the origin scene 111. Accordingly, assuming stationary audio sources 113 of the origin scene 111, rendering positions of the audio sources 113 during the global transition 191 relative to the listening position 201 do not change, even though the listening position may transition from the origin scene to the destination scene (relative to the listener).

Furthermore, it may be fixed at the beginning of the global transition 191 that the listener 181 will arrive at the destination listening position 202 within the destination scene 112 at the end of the global transition 191. During the entire transition 191, a 3D destination audio signal BG may be generated with respect to the destination listening position 202, wherein the destination audio signal only depends on the audio sources 113 of the destination scene 112 (and does not depend on the audio sources 113 of the source scene 111). The global transition 191 does not affect the apparent source positions of the audio sources 113 of the destination scene 112 (relative to the listener).

For determining the 3D intermediate audio signal 203 at an intermediate position and/or at an intermediate time instant 213 during the global transition 191, the origin audio signal at the intermediate time instant 213 may be combined with the destination audio signal at the intermediate time instant 213. In particular, a fade-out factor or gain derived from a fade-out function 211 may be applied to the origin audio signal. The fade-out function 211 may be such that the fade-out factor or gain "a" decreases within increasing distance of the intermediate position from the origin scene 111. Furthermore, a fade-in factor or gain derived from a fade-in function 212 may be applied to the destination audio signal. The fade-in function 212 may be such that the fade-in factor or gain "b" increases with decreasing distance of the intermediate position from the destination scene 112. An example fade-out function 211 and an example fade-in function 212 are shown in FIG. 2. The intermediate audio signal may then be given by the weighted sum of the origin audio signal and the destination audio signal, wherein the weights correspond to the fade-out gain and the fade-in gain, respectively.

Hence, a fade-in function or curve 212 and a fade-out function or curve 211 may be defined for a global transition 191 between different 3 DoF viewports 201, 202. The functions 211, 212 may be applied to pre-rendered virtual objects or 3D audio signals which represent the origin audio scene 111 and the destination audio scene 112. By doing this, consistent audio experience may be provided during a global transition 191 between different audio scenes 111, 112, with reduced VR audio rendering computations.

The intermediate audio signal 203 at an intermediate position $x_i$ may be determined using linear interpolation of the origin audio signal and the destination audio signal. The intensity F of the audio signals may be given by: $F(x_i)=a*F(A_G)\pm(1-a)*F(B_G)$. The factor "a" and "b=1−a" may be given by a norm function a=a( ), which depends on the origin listening position 201, the destination listening position 202 and the intermediate position. Alternatively to a function, a look-up table a=[1, ..., 0] may be provided for different intermediate positions.

In the above, it is understood that the intermediate audio signal 203 can be determined and rendered for a plurality of intermediate positions xi to allow for a smooth transition from the origin scene 111 to the destination scene 112.

During a global transition 191 additional effects (e.g. a Doppler effect and/or reverberation) may be taken into account. The functions 211, 212 may be adapted by a content provider, e.g. to reflect an artistic intent. Information regarding the functions 211, 212 may be included as metadata within the bitstream 140. Hence, an encoder 130 may be configured to provide information regarding a fade-in function 212 and/or a fade-out function 211 as metadata within a bitstream 140. Alternatively or in addition, an audio renderer 160 may apply a function 211, 212 stored at the audio renderer 160.

A flag may be signaled from a listener to the renderer 160, notably to the VR pre-processing unit 161, to indicate to the renderer 160 that a global transition 191 is to be performed from an origin scene 111 to a destination scene 112. The flag may trigger the audio processing described in the present document for generating an intermediate audio signal during the transition phase. The flag may be signaled explicitly or implicitly through related information (e.g. via coordinates of the new viewport or listening position 202). The flag may be sent from any data interface side (e.g. server/content, user/scene, auxiliary). Along with the flag, information about the origin audio signal $A_G$ and the destination audio signal $B_G$ may be provided. By way of example, an ID of one or more audio objects or audio sources may be provided. Alternatively, a request to calculate the origin audio signal and/or the destination audio signal may be provided to the renderer 160.

Hence, a VR renderer 160 comprising a pre-processor unit 161 for a 3 DoF renderer 162 is described for enabling 6 DoF functionality in a resource efficient manner. The pre-processing unit 161 allows the use of a standard 3 DoF renderer 162 such as the MPEG-H 3D audio renderer. The VR pre-processing unit 161 may be configured to efficiently perform calculations for a global transition 191 by using pre-rendered virtual audio objects $A_G$ and $B_G$ that represent the origin scene 111 and the destination scene 112, respectively. The computational complexity is reduced by making use of only two pre-rendered virtual objects during a global transition 191. Each virtual object may comprise a plurality of audio signals for a plurality of audio sources. Furthermore, the bitrate requirements may be reduced, as during the transition 191 only the pre-rendered virtual audio objects $A_G$ and $B_G$ may be provided within the bitstream 140. In addition, processing delays may be reduced.

3 DoF functionality may be provided for all intermediate positions along the global transition trajectory. This may be achieved by overlaying the origin audio object and the destination audio object using fade-out/face-in functions 211, 212. Furthermore, additional audio objects may be rendered and/or extra audio effects may be included.

Figure 3:
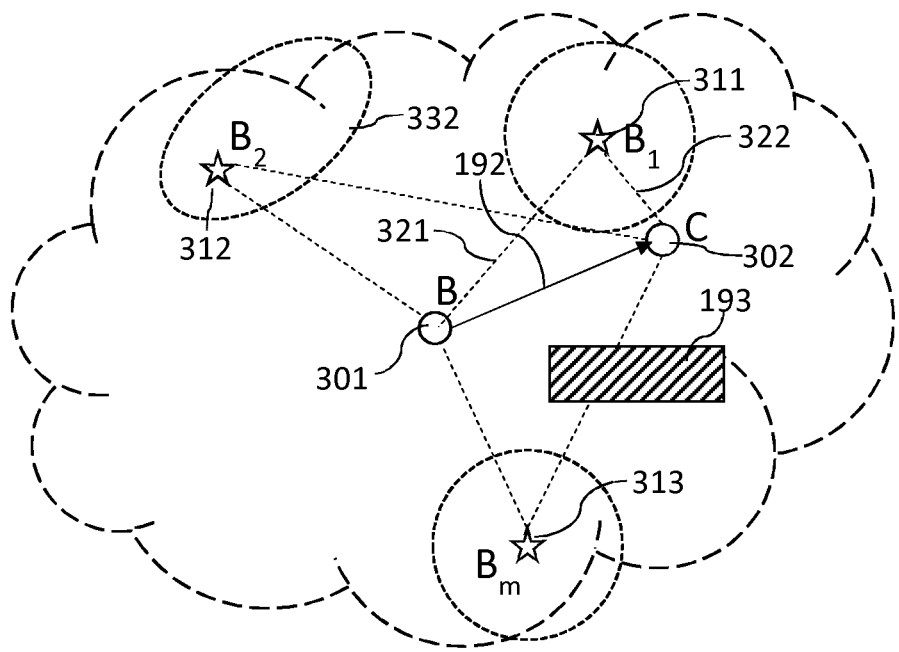
FIG. 3 shows an example audio scene.

FIG. 3 shows an example local transition 192 from an origin listening position B 301 to a destination listening position C 302 within the same audio scene 111. The audio scene 111 comprises different audio sources or objects 311, 312, 313. The different audio sources or objects 311, 312, 313 may have different directivity profiles 332. Furthermore, the audio scene 111 may have environmental properties, notably one or more obstacles, which have an influence on the propagation of audio within the audio scene 111. The environmental properties may be described using environmental data 193. In addition, the relative distances 321, 322 of an audio object 311 to the listening positions 301, 302 may be known.

Figure 4A:
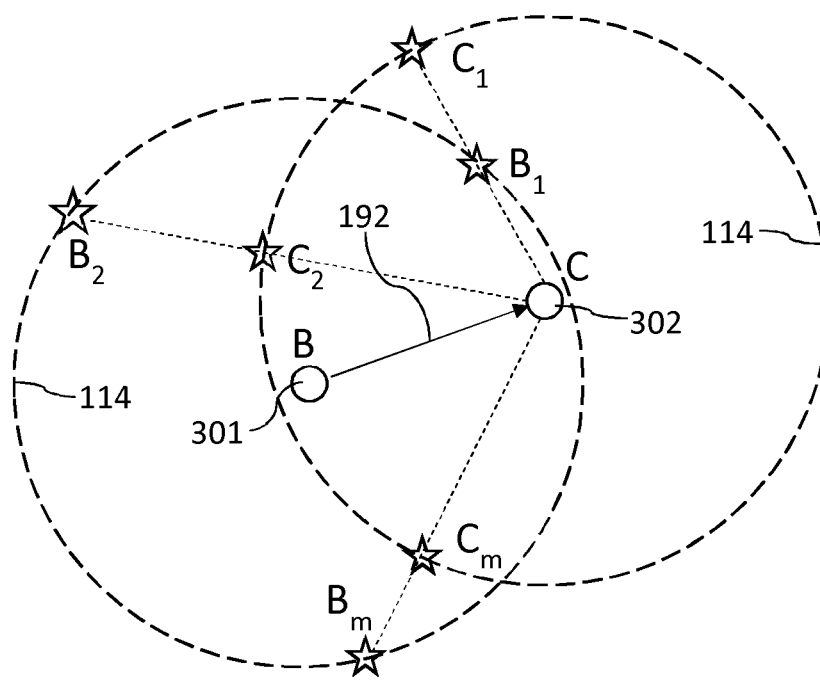
FIG. 4a illustrates the remapping of audio sources in reaction of a change of the listening position within an audio scene.
Figure 4B:
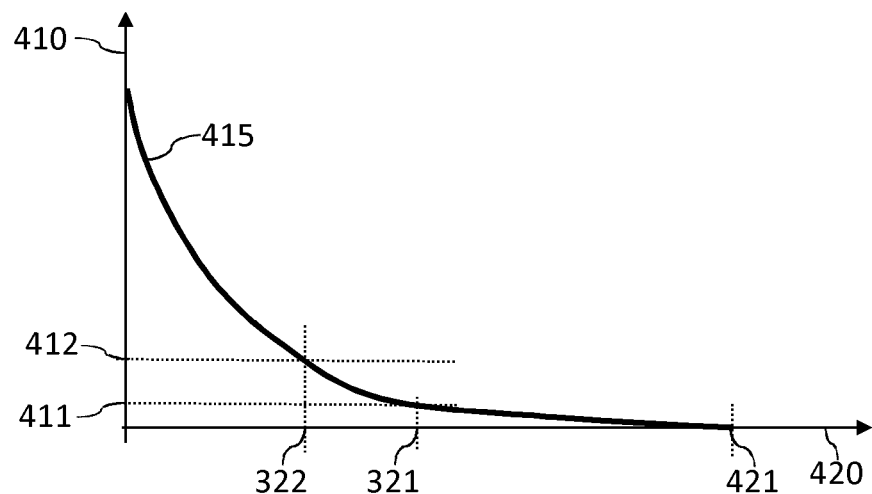
FIG. 4b shows an example distance function.

FIGS. 4a and 4b illustrate a scheme for handling the effects of a local transition 192 on the intensity of the different audio sources or objects 311, 312, 313. As outlined above, the audio source 311, 312, 313 of an audio scene 111 are typically assumed by a 3D audio renderer 162 to be positioned on a sphere 114 around the listening position 301. As such, at the beginning of a local transition 192, the audio sources 311, 312, 313 may be placed on an origin sphere 114 around the origin listening position 301 and at the end of the local transition 192, the audio sources 311, 312, 313 may be placed on a destination sphere 114 around the destination listening position 302. An audio source 311, 312, 313 may be remapped from the origin sphere 114 to the destination sphere 114. For this purpose, a ray that goes from the destination listening position 302 to the source position of the audio source 311, 312, 313 on the origin sphere 114 may be considered. The audio source 311, 312, 313 may be placed on the intersection of the ray with the destination sphere 114.

The intensity F of an audio source 311, 312, 313 on the destination sphere 114 typically differs from the intensity on the origin sphere 114. The intensity F may be modified using an intensity gain function or distance function 415, which provides a distance gain 410 as a function of the distance 420 of an audio source 311, 312, 313 from the listening position 301, 302. The distance function 415 typically exhibits a cut-off distance 421 above which a distance gain 410 of zero is applied. The origin distance 321 of an audio source 311 to the origin listening position 301 provides an origin gain 411. Furthermore, the destination distance 322 of the audio source 311 to the destination listening position 302 provides a destination gain 412. The intensity F of the audio source 311 may be rescaled using the origin gain 411 and the destination gain 412, thereby providing the intensity F of the audio source 311 on the destination sphere 114. In particular, the intensity F of the origin audio signal of the audio source 311 on the origin sphere 114 may be divided by the origin gain 411 and multiplied by the destination gain 412 to provide the intensity F of the destination audio signal of the audio source 311 on the destination sphere 114.

Hence, the position of an audio source 311 subsequent to a local transition 192 may be determined as: $C_i$=source_remap_function($B_i$, C) (e.g. using a geometric transformation). Furthermore, the intensity of an audio source 311 subsequent to a local transition 192 may be determined as: $F(C_i)=F(B_i)$*distance_function($B_i$, $C_i$, C). The distance attenuation may therefore be modelled by the corresponding intensity gains provided by the distance function 415.

Figure 5A:
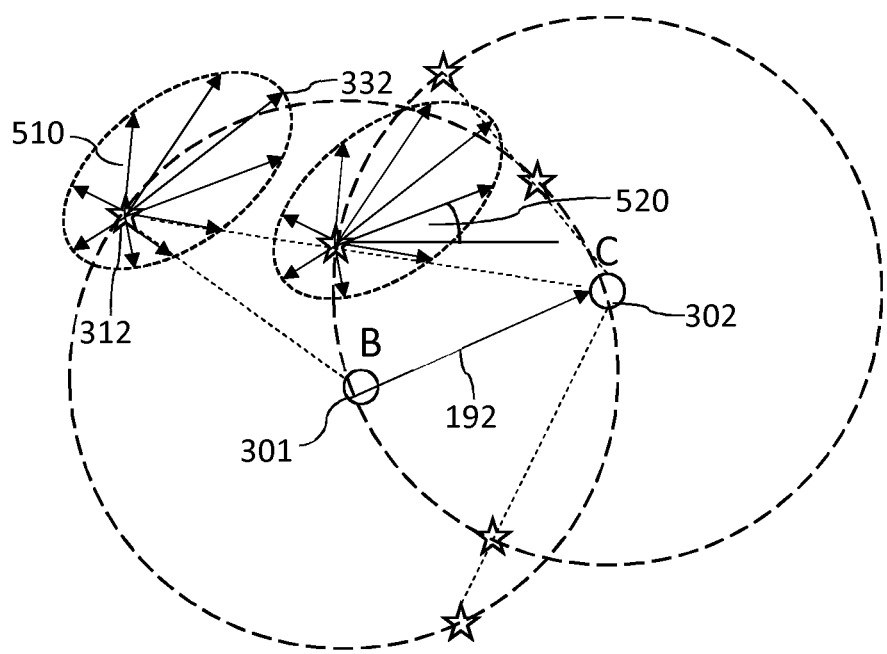
FIG. 5a illustrates an audio source with a non-uniform directivity profile.
Figure 5B:
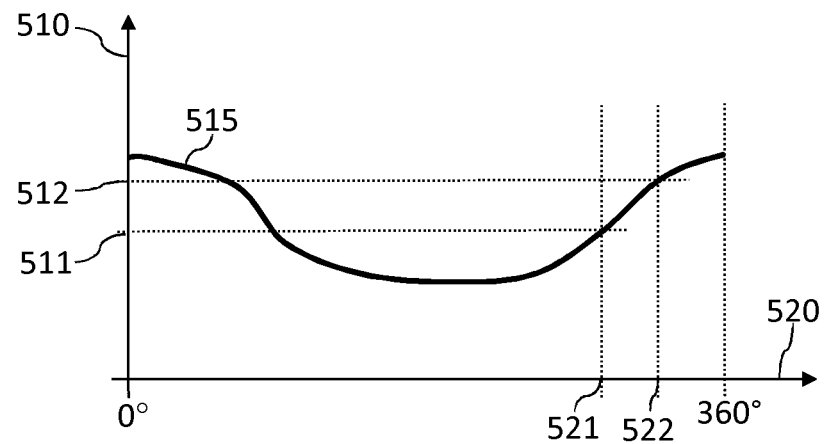
FIG. 5b shows an example directivity function of an audio source.

FIGS. 5a and 5b illustrate an audio source 312 having a non-uniform directivity profile 332. The directivity profile may be defined using directivity gains 510 which indicate a gain value for different directions or directivity angles 520. In particular, the directivity profile 332 of an audio source 312 may be defined using a directivity gain function 515 which indicates the directivity gain 510 as a function of the directivity angle 520 (wherein the angle 520 may range from 0° to 360°). It should be noted that for 3D audio sources 312, the directivity angle 520 is typically a two-dimensional angle comprising an azimuth angle and an elevation angle. Hence, the directivity gain function 515 is typically a two-dimensional function of the two-dimensional directivity angle 520.

The directivity profile 332 of an audio source 312 may be taken into account in the context of a local transition 192 by determining the origin directivity angle 521 of the origin ray between the audio source 312 and the origin listening position 301 (with the audio source 312 being placed on the origin sphere 114 around the origin listening position 301) and the destination directivity angle 522 of the destination ray between the audio source 312 and the destination listening position 302 (with the audio source 312 being placed on the destination sphere 114 around the destination listening position 302). Using the directivity gain function 515 of the audio source 312, the origin directivity gain 511 and the destination directivity gain 512 may be determined as the function values of the directivity gain function 515 for the origin directivity angle 521 and the destination directivity angle 522, respectively (see FIG. 5b). The intensity F of the audio source 312 at the origin listening position 301 may then by divided by the origin directivity gain 511 and multiplied by the destination directivity gain 512 to determine the intensity F of the audio source 312 at the destination listening position 302.

Hence, sound source directivity may be parametrized by a directivity factor or gain 510 indicated by a directivity gain function 515. The directivity gain function 515 may indicate the intensity of the audio source 312 at some distance as a function of the angle 520 relative to the listening position 301, 302. The directivity gains 510 may be defined as ratios with respect to the gains of an audio source 312 at the same distance, having the same total power that is radiated uniformly in all directions. The directivity profile 332 may be parametrized by a set of gains 510 that correspond to vectors which originate at the center of the audio source 312 and which end at points distributed on a unit sphere around the center of the audio source 312. The directivity profile 332 of an audio source 312 may depend on a use-case scenario and on available data (e.g. a uniform distribution for a 3D-flying case, a flatted distribution for 2D+ use-cases, etc.).

The resulting audio intensity of an audio source 312 at a destination listening position 302 may be estimated as: $F(C_i)=F(B_i)$*Distance_function( )*Directivity_gain_function($C_i$, C, Directivity_paramertization), wherein the Directivity_gain_function is dependent of the directivity profile 332 of the audio source 312. The Distance_function( ) takes into account the modified intensity caused by the change in distance 321, 322 of the audio source 312 due to the transition of the audio source 312.

Figure 6:
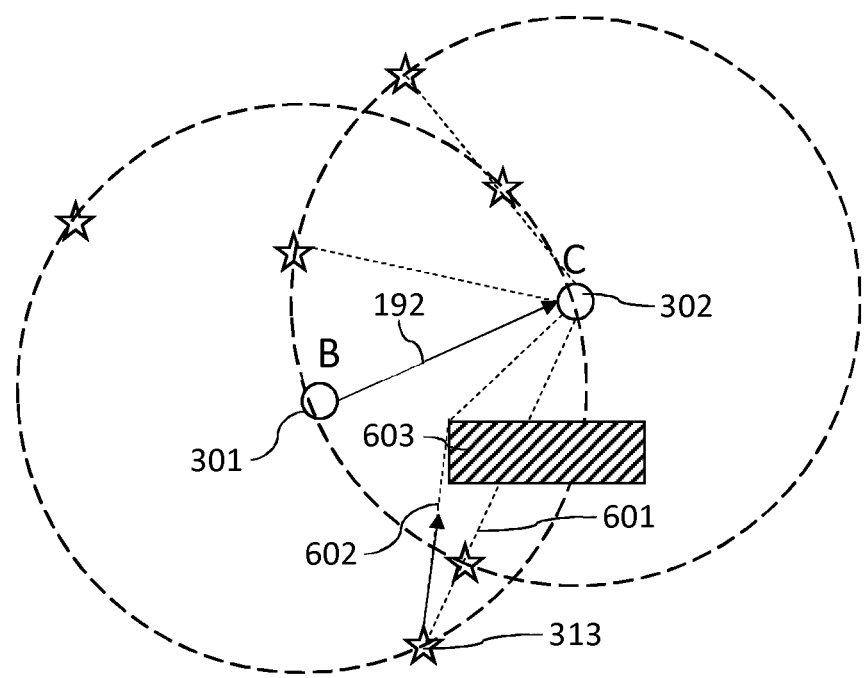
FIG. 6 shows an example audio scene with an acoustically relevant obstacle.

FIG. 6 shows an example obstacle 603 which may need to be taken into account in the context of a local transition 192 between different listening positions 301, 302. In particular, the audio source 313 may be hidden behind the obstacle 603 at the destination listening position 302. The obstacle 603 may be described by environmental data 193 comprising a set of parameters, such as spatial dimensions of the obstacle 603 and an obstacle attenuation function, which indicates the attenuation of sound caused by the obstacle 603.

An audio source 313 may exhibit an obstacle-free distance 602 (OFD) to the destination listening position 302. The OFD 602 may indicate the length of the shortest path between the audio source 313 and the destination listening position 302, which does not traverse the obstacle 603. Furthermore, the audio source 313 may exhibit a going-through distance 601 (GHD) to the destination listening position 302. The GHD 601 may indicate the length of the shortest path between the audio source 313 and the destination listening position 302, which typically goes through the obstacle 603. The obstacle attenuation function may be a function of the OFD 602 and of the GHD 601. Furthermore, the obstacle attenuation function may be a function of the intensity $F(B_i)$ of the audio source 313.

The intensity of the audio source $C_i$ at destination listening position 302 may be a combination of the sound from the audio source 313 that passes around the obstacle 603 and of the sound from the audio source 313 that goes through the obstacle 603.

Hence, the VR renderer 160 may be provided with parameters for controlling the influence of environmental geometry and media. The obstacle geometry/media data 193 or parameters may be provided by a content-provider and/or encoder 130. The audio intensity of an audio source 313 may be estimated as: $F(C_i)=F(B_i)$*Distance_function(OFD)*Directivity_gain_function(OFD)+Obstacle_attenuation_function(F(Bi), OFD, GHD). The first term corresponds to the contribution of the sound that passes around an obstacle 603. The second term corresponds to the contribution of the sound that goes through an obstacle 603.

The minimal obstacle-free distance (OFD) 602 may be determined using A*Dijkstra's pathfinding algorithm and may be used for controlling the direct sound attenuation. The going-through distance (GHD) 601 may be used for controlling reverberation and distortion. Alternatively or in addition, a raycasting approach may be used to describe the effects of an obstacle 603 on the intensity of an audio source 313.

Figure 7:
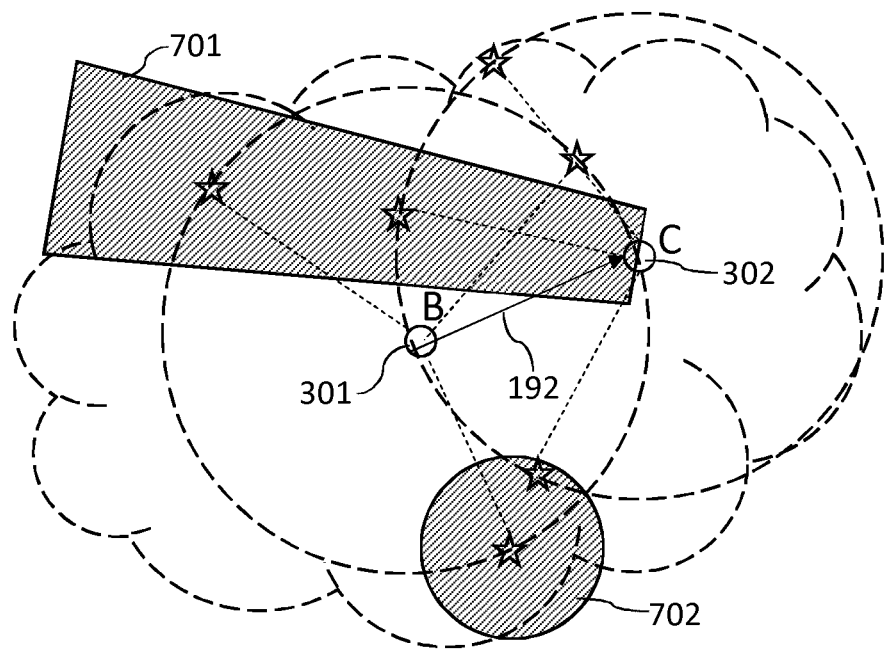
FIG. 7 illustrates a field of view and an attention focus of a listener.

FIG. 7 illustrates an example field of view 701 of a listener 181 placed at the destination listening position 302. Furthermore, FIG. 7 shows an example attention focus 702 of a listener placed at the destination listening position 302. The field of view 701 and/or the attention focus 702 may be used to enhance (e.g. to amplify) audio coming from an audio source that lies within the field of view 701 and/or the attention focus 702. The field of view 701 may be considered to be a user-driven effect and may be used for enabling a sound enhancer for audio sources 311 associated with the user's field of view 701. In particular, a "cocktail party effect" simulation may be performed by removing frequency tiles from a background audio source to enhance understandability of a speech signal associated with the audio source 311 that lies within the listener's field of view 701. The attention focus 702 may be viewed as a content-driven effect and may be used for enabling an sound enhancer for audio sources 311 associated with a content region of interest (e.g. attracting the user's attention to look and/or to move to the direction of an audio source 311)

The audio intensity of an audio source 311 may be modified as: $F(B_i)$=Field_of_view_function(C, $F(B_i)$, Field_of_view_data), wherein the Field_of_view_function describes the modification which is applied to an audio signal of an audio source 311 which lies within the field of view 701 of the listener 181. Furthermore, the audio intensity of an audio source lying within the attention focus 702 of the listener may be modified as: $F(B_i)$=Attention_focus_function($F(B_i)$, Attention_focus_data), wherein the attention_focus_function describes the modification which is applied to an audio signal of an audio source 311 which lies within the attention focus 702.

The functions which are described in the present document for handling the transition of the listener 181 from an origin listening position 301 to a destination listening position 302 may be applied in an analogous manner to a change of position of an audio source 311, 312, 313.

Hence, the present document describes efficient means for calculating coordinates and/or audio intensities of virtual audio objects or audio sources 311, 312, 313 that represent a local VR audio scene 111 at arbitrary listening positions 301, 302. The coordinates and/or intensities may be determined taking in account sound source distance attenuation curves, sound source orientation and directivity, environmental geometry/media influence and/or "field of view" and "attention focus" data for additional audio signal enhancements. The described schemes may significantly reduce computational complexity by performing calculations only if the listening position 301, 302 and/or the position of an audio object/source 311, 312, 313 changes.

Furthermore, the present document describes concepts for the specification of distances, directivity, geometry functions, processing and/or signaling mechanisms for a VR renderer 160. Furthermore, a concept for minimal "obstacle-free distance" for controlling direct sound attenuation and "going-through distance" for controlling reverberation and distortion is described. In addition, a concept for sound source directivity parametrization is described.

Figure 8:
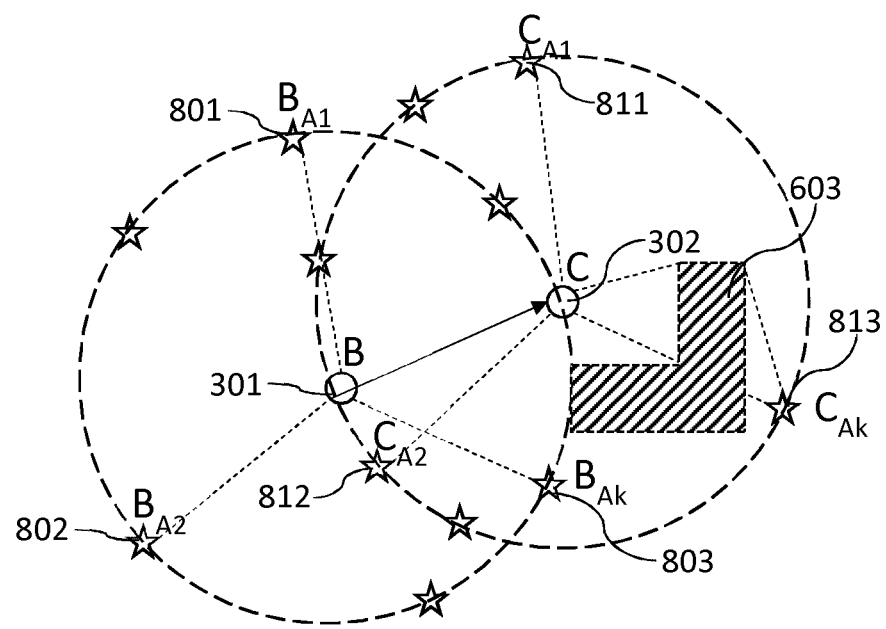
FIG. 8 illustrates the handling of ambient audio in case of a change of the listening position within an audio scene.

FIG. 8 illustrates the handling of ambience sound sources 801, 802, 803 in the context of a local transition 192. In particular, FIG. 8 shows three different ambience sound sources 801, 802, 803, wherein an ambience sound may be attributed to a point audio source. An ambience flag may be provided to the pre-processing unit 161 in order to indicate that a point audio source 311 is an ambience audio source 801. The processing during a local and/or global transition of the listening position 301, 302 may be dependent on the value of the ambience flag.

In the context of a global transition 191 an ambience sound source 801 may be handled like a normal audio source 311. FIG. 8 illustrates a local transition 192. The position of an ambience sound source 801, 802, 803 may be copied from the origin sphere 114 to the destination sphere 114, thereby providing the position of the ambience sound source 811, 812, 813 at the destination listening position 302. Furthermore, the intensity of the ambience sound source 801 may be kept unchanged, if the environmental conditions remain unchanged, $F(C_{Ai})=F(B_{Ai})$. On the other hand, in case of an obstacle 603, the intensity of an ambience sound source 803, 813 may be determined using the obstacle attenuation function, e.g. as $F(C_{Ai})=F(B\underline{Ai})$*Distance_function$_{Ai}$(OFD)+Obstacle_attenuation_function($F(B_{Ai})$, OFD, GHD).

Figure 9A:
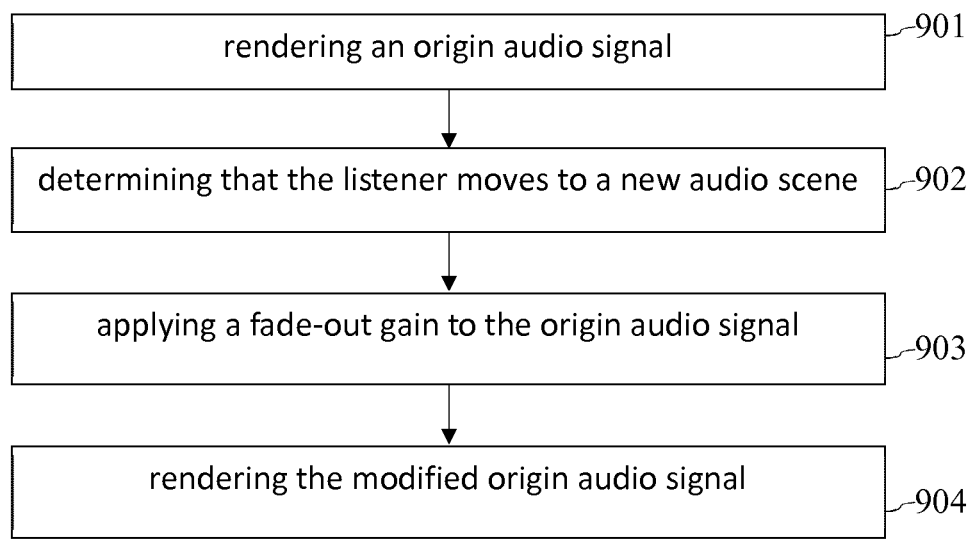
FIG. 9a shows a flow chart of an example method for rendering a 3D audio signal during a transition between different audio scenes.

FIG. 9a shows the flow chart of an example method 900 for rendering audio in a virtual reality rendering environment 180. The method 900 may be executed by a VR audio renderer 160. The method 900 comprises rendering 901 an origin audio signal of an origin audio source 113 of an origin audio scene 111 from an origin source position on a sphere 114 around a listening position 201 of a listener 181. The rendering 901 may be performed using a 3D audio renderer 162 which may be limited to handling only 3 DoF, notably which may be limited to handling only rotational movements of the head of the listener 181. In particular, the 3D audio renderer 162 may not be configured to handle translational movements of the head of the listener. The 3D audio renderer 162 may comprise or may be an MPEG-H audio renderer.

It should be noted that the expression "rendering an audio signal of an audio source 113 from a particular source position" indicates that the listener 181 perceives the audio signal as coming from the particular source position. The expression should not be understood as being a limitation on how the audio signal is actually rendered. Various different rendering techniques may be used to "render an audio signal from a particular source position", i.e. to provide a listener 181 with the perception that an audio signal is coming from a particular source position.

Furthermore, the method 900 comprises determining 902 that the listener 181 moves from the listening position 201 within the origin audio scene 111 to a listening position 202 within a different destination audio scene 112. Hence, a global transition 191 from the origin audio scene 111 to the destination audio scene 112 may be detected. In this context, the method 900 may comprise receiving an indication that the listener 181 moves from the origin audio scene 111 to the destination audio scene 112. The indication may comprise or may be a flag. The indication may be signaled from the listener 181 to the VR audio renderer 160, e.g. via a user interface of the VR audio renderer 160.

Typically, the origin audio scene 111 and the destination audio scene 112 each comprise one or more audio sources 113 which are different from one another. In particular, the origin audio signals of the one or more origin audio sources 113 may not be audible within the destination audio scene 112 and/or the destination audio signals of the one or more destination audio sources 113 may not be audible within the origin audio scene 111.

The method 900 may comprise (in reaction to determining that a global transition 191 to a new destination audio scene 112 is performed) applying 903 a fade-out gain to the origin audio signal to determine a modified origin audio signal. Notably, the origin audio signal is generated as it would be perceived at the listening position in the origin audio scene 111, regardless of the movement of the listener 181 from the listening position 201 within the origin audio scene 111 to the listening position 202 within the destination audio scene 112. Furthermore, the method 900 may comprise (in reaction to determining that a global transition 191 to a new destination audio scene 112 is performed) rendering 904 the modified origin audio signal of the origin audio source 113 from the origin source position on the sphere 114 around the listening position 201, 202. These operations may be repeatedly performed, e.g., at regular time intervals, during the global transition 191.

Hence, a global transition 191 between different audio scenes 111, 112 may be performed by progressively fading out the origin audio signals of the one or more origin audio sources 113 of the origin audio scene 111. As a result of this, a computationally efficient and acoustically consistent global transition 191 between different audio scenes 111, 112 is provided.

It may be determined that the listener 181 moves from the origin audio scene 111 to the destination audio scene 112 during a transition time interval, wherein the transition time interval typically has a certain duration (e.g. 2 s, 1 s, 500 ms, or less). The global transition 191 may be performed progressively within the transition time interval. In particular, during the global transition 191 an intermediate time instant 213 within the transition time interval may be determined (e.g. according to a certain sampling rate of e.g. 100 ms, 50 ms, 20 ms or less). The fade-out gain may then be determined based on a relative location of the intermediate time instant 213 within the transition time interval.

In particular, the transition time interval for the global transition 191 may be subdivided into a sequence of intermediate time instants 213. For each intermediate time instant 213 of the sequence of intermediate time instants 213 a fade-out gain for modifying the origin audio signals of the one or more origin audio sources may be determined. Furthermore, at each intermediate time instant 213 of the sequence of intermediate time instants 213 the modified origin audio signals of the one or more origin audio sources 113 may be rendered from the origin source position on the sphere 114 around the listening position 201, 202. By doing this, an acoustically consistent global transition 191 may be performed in a computationally efficient manner.

The method 900 may comprise providing a fade-out function 211 which indicates the fade-out gain at different intermediate time instants 213 within the transition time interval, wherein the fade-out function 211 is typically such that the fade-out gain decreases with progressing intermediate time instants 213, thereby providing a smooth global transition 191 to the destination audio scene 112. In particular, the fade-out function 211 may be such that the origin audio signal remains unmodified at the beginning of the transition time interval, that the origin audio signal is increasingly attenuated at progressing intermediate time instants 213, and/or that the origin audio signal is fully attenuated at the end of the transition time interval.

The origin source position of the origin audio source 113 on the sphere 114 around the listening position 201, 202 may be maintained as the listener 181 moves from the origin audio scene 111 to the destination audio scene 112 (notably during the entire transition time interval). Alternatively or in addition, it may be assumed (during the entire transition time interval) that the listener 181 remains at the same listening position 201, 202. By doing this, the computational complexity for a global transition 191 between audio scenes 111, 112 may be reduced further.

The method 900 may further comprise determining a destination audio signal of a destination audio source 113 of the destination audio scene 112. Furthermore, the method 900 may comprise determining a destination source position on the sphere 114 around the listening position 201, 202. Notably, the destination audio signal is generated as it would be perceived at the listening position in the destination audio scene 112, regardless of the movement of the listener 181 from the listening position 201 within the origin audio scene 111 to the listening position 202 within the destination audio scene 112. In addition, the method 900 may comprise applying a fade-in gain to the destination audio signal to determine a modified destination audio signal. The modified destination audio signal of the destination audio source 113 may then be rendered from the destination source position on the sphere 114 around the listening position 201, 202. These operations may be repeatedly performed, e.g., at regular time intervals, during the global transition 191.

Hence, in an analogous manner to the fading-out of the origin audio signals of the one or more origin audio sources 113 of the origin scene 111, the destination audio signals of one or more destination audio sources 113 of the destination scene 112 may be faded-in, thereby providing a smooth global transition 191 between audio scenes 111, 112.

As indicated above, the listener 181 may move from the origin audio scene 111 to the destination audio scene 112 during a transition time interval. The fade-in gain may be determined based on a relative location of an intermediate time instant 213 within the transition time interval. In particular, a sequence of fade-in gains may be determined for a corresponding sequence of intermediate time instants 213 during the global transition 191.

The fade-in gains may be determined using a fade-in function 212 which indicates the fade-in gain at different intermediate time instants 213 within the transition time interval, wherein the fade-in function 212 is typically such that the fade-in gain increases with progressing intermediate time instants 213. In particular, the fade-in function 212 may be such that the destination audio signal is fully attenuated at the beginning of the transition time interval, that the destination audio signal is decreasingly attenuated at progressing intermediate time instants 213 and/or that the destination audio signal remains unmodified at the end of the transition time interval, thereby providing a smooth global transition 191 between audio scenes 111, 112 in a computationally efficient manner.

In the same manner as the origin source position of an origin audio source 113, the destination source position of a destination audio source 113 on the sphere 114 around the listening position 201, 202 may be maintained as the listener 181 moves from the origin audio scene 111 to the destination audio scene 112, notably during the entire transition time interval. Alternatively or in addition, it may be assumed (during the entire transition time interval) that the listener 181 remains at the same listening position 201, 202. By doing this, the computational complexity for a global transition 191 between audio scenes 111, 112 may be reduced further.

The fade-out function 211 and the fade-in function 212 in combination may provide a constant gain for a plurality of different intermediate time instants 213. In particular, the fade-out function 211 and the fade-in function 212 may add up to a constant value (e.g. 1) for a plurality of different intermediate time instants 213. Hence, the fade-in function 212 and the fade-out function 211 may be interdependent, thereby providing a consistent audio experience during the global transition 191.

The fade-out function 211 and/or the fade-in function 212 may be derived from a bitstream 140 which is indicative of the origin audio signal and/or the destination audio signal. The bitstream 140 may be provided by an encoder 130 to the VR audio renderer 160. Hence, the global transition 191 may be controlled by a content provider. Alternatively or in addition, the fade-out function 211 and/or the fade-in function 212 may be derived from a storage unit of the virtual reality (VR) audio render 160 which is configured to render the origin audio signal and/or the destination audio signal within the virtual reality rendering environment 180, thereby providing a reliable operation during global transitions 191 between audio scenes 111, 112.

The method 900 may comprise sending an indication (e.g. a flag indicating) that the listener 181 moves from the origin audio scene 111 to the destination audio scene 112 to an encoder 130, wherein the encoder 130 may be configured to generate a bitstream 140 which is indicative of the origin audio signal and/or of the destination audio signal. The indication may enable the encoder 130 to selectively provide the audio signals for the one or more audio sources 113 of the origin audio scene 111 and/or for the one or more audio sources 113 of the destination audio scene 112 within the bitstream 140. Hence, providing an indication for an upcoming global transition 191 enables a reduction of the required bandwidth for the bitstream 140.

As already indicated above, the origin audio scene 111 may comprise a plurality of origin audio sources 113. Hence, the method 900 may comprise rendering a plurality of origin audio signals of the corresponding plurality of origin audio sources 113 from a plurality of different origin source positions on the sphere 114 around the listening position 201, 202. Furthermore, the method 900 may comprise applying the fade-out gain to the plurality of origin audio signals to determine a plurality of modified origin audio signals. In addition, the method 900 may comprise rendering the plurality of modified origin audio signals of the origin audio source 113 from the corresponding plurality of origin source positions on the sphere 114 around the listening position 201, 202.

In an analogous manner, the method 900 may comprise determining a plurality of destination audio signals of a corresponding plurality of destination audio sources 113 of the destination audio scene 112. In addition, the method 900 may comprise determining a plurality of destination source positions on the sphere 114 around the listening position 201, 202. Furthermore, the method 900 may comprise applying the fade-in gain to the plurality of destination audio signals to determine a corresponding plurality of modified destination audio signals. The method 900 further comprises rendering the plurality of modified destination audio signals of the plurality of destination audio sources 113 from the corresponding plurality of destination source positions on the sphere 114 around the listening position 201, 202.

Alternatively or in addition, the origin audio signal which is rendered during a global transition 191 may be an overlay of audio signals of a plurality of origin audio sources 113. In particular, at the beginning of the transition time interval, the audio signals of (all) the audio sources 113 of the origin audio scene 111 may be combined to provide a combined origin audio signal. This origin audio signal may be modified with the fade-out gain. Furthermore, the origin audio signal may be updated at a particular sampling rate (e.g. 20 ms) during the transition time interval. In an analogous manner, the destination audio signal may correspond to a combination of the audio signals of a plurality of destination audio sources 113 (notably of all destination audio sources 113). The combined destination audio source may then be modified during the transition time interval using the fade-in gain. By combining the audio signal of the origin audio scene 111 and of the destination audio scene 112, respectively, the computational complexity may be further reduced.

Furthermore, a virtual reality audio renderer 160 for rendering audio in a virtual reality rendering environment 180 is described. As outlined in the present document, the VR audio renderer 160 may comprise a pre-processing unit 161 and a 3D audio renderer 162. The virtual reality audio renderer 160 is configured to render an origin audio signal of an origin audio source 113 of an origin audio scene 111 from an origin source position on a sphere 114 around a listening position 201 of a listener 181. Furthermore, the VR audio renderer 160 is configured to determine that the listener 181 moves from the listening position 201 within the origin audio scene 111 to a listening position 202 within a different destination audio scene 112. In addition, the VR audio renderer 160 is configured to apply a fade-out gain to the origin audio signal to determine a modified origin audio signal, and to render the modified origin audio signal of the origin audio source 113 from the origin source position on the sphere 114 around the listening position 201, 202.

Furthermore, an encoder 130 which is configured to generate a bitstream 140 indicative of an audio signal to be rendered within a virtual reality rendering environment 180 is described. The encoder 130 may be configured to determine an origin audio signal of an origin audio source 113 of an origin audio scene 111. Furthermore, the encoder 130 may be configured to determine origin position data regarding an origin source position of the origin audio source 113. The encoder 130 may then generate a bitstream 140 comprising the origin audio signal and the origin position data.

The encoder 130 may be configured to receive an indication that a listener 181 moves from the origin audio scene 111 to a destination audio scene 112 within the virtual reality rendering environment 180 (e.g. via a feedback channel from a VR audio renderer 160 towards the encoder 130).

The encoder 130 may then determine a destination audio signal of a destination audio source 113 of the destination audio scene 112, and destination position data regarding a destination source position of the destination audio source 113 (notably only in reaction to receiving such an indication). Furthermore, the encoder 130 may generate a bitstream 140 comprising the destination audio signal and the destination position data. Hence, the encoder 130 may be configured to provide the destination audio signals of one or more destination audio sources 113 of the destination audio scene 112 selectively only subject to receiving an indication for a global transition 191 to the destination audio scene 112. By doing this, the required bandwidth for the bitstream 140 may be reduced.

Figure 9B:
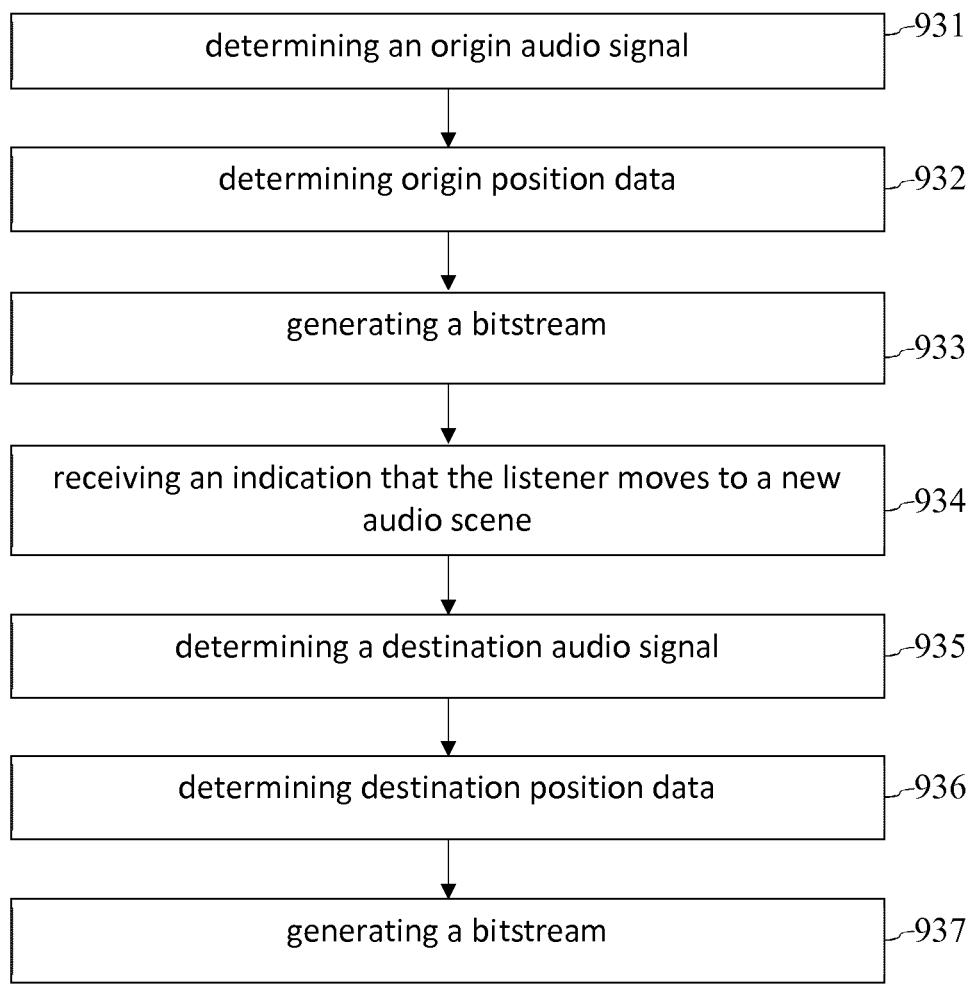
FIG. 9b shows a flow chart of an example method for generating a bitstream for the transition between different audio scenes.

FIG. 9b shows a flow chart of a corresponding method 930 for generating a bitstream 140 indicative of an audio signal to be rendered within a virtual reality rendering environment 180. The method 930 comprises determining 931 an origin audio signal of an origin audio source 113 of an origin audio scene 111. Furthermore, the method 930 comprises determining 932 origin position data regarding an origin source position of the origin audio source 113. In addition, the method 930 comprises generating 933 a bitstream 140 comprising the origin audio signal and the origin position data.

The method 930 comprises receiving 934 an indication that a listener 181 moves from the origin audio scene 111 to a destination audio scene 112 within the virtual reality rendering environment 180. In reaction to this, the method 930 may comprise determining 935 a destination audio signal of a destination audio source 113 of the destination audio scene 112, and determining 936 destination position data regarding a destination source position of the destination audio source 113. Furthermore, the method 930 comprises generating 937 a bitstream 140 comprising the destination audio signal and the destination position data.

Figure 9C:
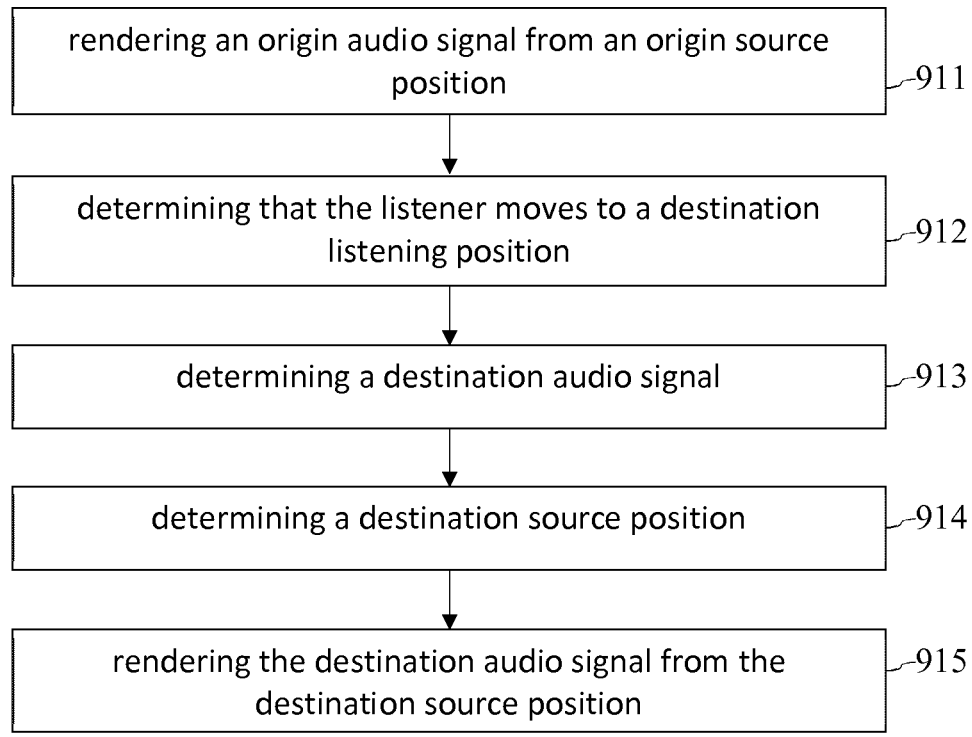
FIG. 9c shows a flow chart of an example method for rendering a 3D audio signal during a transition within an audio scene.

FIG. 9c shows a flow chart of an example method 910 for rendering an audio signal in a virtual reality rendering environment 180. The method 910 may be executed by a VR audio renderer 160.

The method 910 comprises rendering 911 an origin audio signal of an audio source 311, 312, 313 from an origin source position on an origin sphere 114 around an origin listening position 301 of a listener 181. The rendering 911 may be performed using a 3D audio renderer 162. In particular, the rendering 911 may be performed under the assumption that the origin listening position 301 is fixed. Hence, the rendering 911 may be limited to three degrees of freedom (notably to a rotational movement of the head of the listener 181).

In order to take into account additional three degrees of freedom (e.g. for a translational movement of the listener 181), the method 910 may comprise determining 912 that the listener 181 moves from the origin listening position 301 to a destination listening position 302, wherein the destination listening position 302 typically lies within the same audio scene 111. Hence, it may be determined 912 that the listener 181 performs a local transition 192 within the same audio scene 111.

In reaction to determining that the listener 181 performs a local transition 192, the method 910 may comprise determining 913 a destination source position of the audio source 311, 312, 313 on a destination sphere 114 around the destination listening position 302 based on the origin source position. In other words, the source position of the audio source 311, 312, 313 may be transferred from an origin sphere 114 around the origin listening position 301 to a destination sphere 114 around the destination position 302. This may be achieved by projecting the origin source position from the origin sphere 114 onto the destination sphere 114. In particular, the destination source position may be determined such that the destination source position corresponds to an intersection of a ray between the destination listening position 302 and the origin source position with the destination sphere 114.

Furthermore, the method 910 may comprise (in reaction to determining that the listener 181 performs a local transition 192) determining 914 a destination audio signal of the audio source 311, 312, 313 based on the origin audio signal. In particular, the intensity of the destination audio signal may be determined based on the intensity of the origin audio signal. Alternatively or in addition, the spectral composition of the destination audio signal may be determined based on the spectral composition of the origin audio signal. Hence, it may be determined, how the audio signal of the audio source 311, 312, 313 is perceived from the destination listening position 302 (notably the intensity and/or the spectral composition of the audio signal may be determined).

The above mentioned determining steps 913, 914 may be performed by a pre-processing unit 161 of the VR audio renderer 160. The pre-processing unit 161 may handle a translational movement of the listener 181 by transferring the audio signals of one or more audio sources 311, 312, 313 from an origin sphere 114 around the origin listening position 301 to a destination sphere 114 around the destination listening position 302. As a result of this, the transferred audio signals of the one or more audio sources 311, 312, 313 may also be rendered using a 3D audio renderer 162 (which may be limited to 3 DoFs). Hence, the method 910 allows for an efficient provision of 6 DoFs within a VR audio rendering environment 180.

Consequently, the method 910 may comprise rendering 915 the destination audio signal of the audio source 311, 312, 313 from the destination source position on the destination sphere 114 around the destination listening position 302 (e.g. using a 3D audio renderer, such as the MPEG-H audio renderer).

Determining 914 the destination audio signal may comprise determining a destination distance 322 between the origin source position and the destination listening position 302. The destination audio signal (notably the intensity of the destination audio signal) may then be determined (notably scaled) based on the destination distance 322. In particular, determining 914 the destination audio signal may comprise applying a distance gain 410 to the origin audio signal, wherein the distance gain 410 is dependent on the destination distance 322.

A distance function 415 may be provided, which is indicative of the distance gain 410 as a function of a distance 321, 322 between a source position of an audio signal 311, 312, 313 and a listening position 301, 302 of a listener 181. The distance gain 410 which is applied to the origin audio signal (for determining the destination audio signal) may be determined based on the functional value of the distance function 415 for the destination distance 322. By doing this, the destination audio signal may be determined in an efficient and precise manner.

Furthermore, determining 914 the destination audio signal may comprise determining an origin distance 321 between the origin source position and the origin listening position 301. The destination audio signal may then be determined (also) based on the origin distance 321. In particular, the distance gain 410 which is applied to the origin audio signal may be determined based on the functional value of the distance function 415 for the origin distance 321. In a preferred example the functional value of the distance function 415 for the origin distance 321 and the functional value of the distance function 415 for the destination distance 322 are used to rescale the intensity of the origin audio signal to determine the destination audio signal. Hence, an efficient and precise local transition 191 within an audio scene 111 may be provided.

Determining 914 the destination audio signal may comprise determining a directivity profile 332 of the audio source 311, 312, 313. The directivity profile 332 may be indicative of the intensity of the origin audio signal in different directions. The destination audio signal may then be determined (also) based on the directivity profile 332. By taking into account the directivity profile 332, the acoustic quality of a local transition 192 may be improved.

The directivity profile 332 may be indicative of a directivity gain 510 to be applied to the origin audio signal for determining the destination audio signal. In particular, the directivity profile 332 may be indicative of a directivity gain function 515, wherein the directivity gain function 515 may indicate the directivity gain 510 as a function of a (possibly two-dimensional) directivity angle 520 between a source position of an audio source 311, 312, 313 and a listening position 301, 302 of a listener 181.

Hence, determining 914 the destination audio signal may comprise determining a destination angle 522 between the destination source position and the destination listening position 302. The destination audio signal may then be determined based on the destination angle 522. In particular, the destination audio signal may be determined based on the functional value of the directivity gain function 515 for the destination angle 522.

Alternatively or in addition, determining 914 the destination audio signal may comprise determining an origin angle 521 between the origin source position and the origin listening position 301. The destination audio signal may then be determined based on the origin angle 521. In particular, the destination audio signal may be determined based on the functional value of the directivity gain function 515 for the origin angle 521. In a preferred example, the destination audio signal may be determined by modifying the intensity of the origin audio signal using the functional value of the directivity gain function 515 for the origin angle 521 and for the destination angle 522, to determine the intensity of the destination audio signal.

Furthermore, the method 910 may comprise determining destination environmental data 193 which is indicative of an audio propagation property of the medium between the destination source position and the destination listening position 302. The destination environmental data 193 may be indicative of an obstacle 603 that is positioned on a direct path between the destination source position and the destination listening position 302; indicative of information regarding spatial dimensions of the obstacle 603; and/or indicative of an attenuation incurred by an audio signal on the direct path between the destination source position and the destination listening position 302. In particular, the destination environmental data 193 may be indicative of an obstacle attenuation function of an obstacle 603, wherein the attenuation function may indicate an attenuation incurred by an audio signal that passes through the obstacle 603 on the direct path between the destination source position and the destination listening position 302.

The destination audio signal may then be determined based on the destination environmental data 193, thereby further increasing the quality of audio rendered within a VR rendering environment 180.

As indicated above, the destination environmental data 193 may be indicative of an obstacle 603 on the direct path between the destination source position and the destination listening position 302. The method 910 may comprise determining a going-through distance 601 between the destination source position and the destination listening position 302 on the direct path. The destination audio signal may then be determined based on the going-through distance 601. Alternatively or in addition, an obstacle-free distance 602 between the destination source position and the destination listening position 302 on an indirect path, which does not traverse the obstacle 603, may be determined. The destination audio signal may then be determined based on the obstacle-free distance 602.

In particular, an indirect component of the destination audio signal may be determined based on the origin audio signal propagating along the indict path. Furthermore, a direct component of the destination audio signal may be determined based on the origin audio signal propagating along the direct path. The destination audio signal may then be determined by combining the indirect component and the direct component. By doing this, the acoustic effects of an obstacle 603 may be taken into account in a precise and efficient manner.

Furthermore, the method 910 may comprise determining focus information regarding a field of view 701 and/or an attention focus 702 of the listener 181. The destination audio signal may then be determined based on the focus information. In particular, a spectral composition of an audio signal may be adapted depending of the focus information. By doing this, the VR experience of a listener 181 may be further improved.

In addition, the method 910 may comprise determining that the audio source 311, 312, 313 is an ambience audio source. In this context, an indication (e.g. a flag) may be received within a bitstream 140 from an encoder 130, wherein the indication indicates that an audio source 311, 312, 313 is an ambience audio source. An ambience audio source typically provides a background audio signal. The origin source position of an ambience audio source may be maintained as the destination source position. Alternatively or in addition, the intensity of the origin audio signal of the ambience audio source may be maintained as the intensity of the destination audio signal. By doing this, ambience audio sources may be handled efficiently and consistently in the context of a local transition 192.

The above mentioned aspects are applicable to audio scenes 111 comprising a plurality of audio sources 311, 312, 313. In particular, the method 910 may comprise rendering a plurality of origin audio signals of a corresponding plurality of audio sources 311, 312, 313 from a plurality of different origin source positions on the origin sphere 114. In addition, the method 910 may comprise determining a plurality of destination source positions for the corresponding plurality of audio sources 311, 312, 313 on the destination sphere 114 based on the plurality of origin source positions, respectively. In addition, the method 910 may comprise determining a plurality of destination audio signals of the corresponding plurality of audio sources 311, 312, 313 based on the plurality of origin audio signals, respectively. The plurality of destination audio signals of the corresponding plurality of audio sources 311, 312, 313 may then be rendered from the corresponding plurality of destination source positions on the destination sphere 114 around the destination listening position 302.

Furthermore, a virtual reality audio renderer 160 for rendering an audio signal in a virtual reality rendering environment 180 is described. The audio renderer 160 is configured to render an origin audio signal of an audio source 311, 312, 313 from an origin source position on an origin sphere 114 around an origin listening position 301 of a listener 181 (notably using a 3D audio renderer 162 of the VR audio renderer 160).

Furthermore, the VR audio renderer 160 is configured to determine that the listener 181 moves from the origin listening position 301 to a destination listening position 302. In reaction to this, the VR audio renderer 160 may be configured (e.g. within a pre-processing unit 161 of the VR audio renderer 160) to determine a destination source position of the audio source 311, 312, 313 on a destination sphere 114 around the destination listening position 302 based on the origin source position, and to determine a destination audio signal of the audio source 311, 312, 313 based on the origin audio signal.

In addition, the VR audio renderer 160 (e.g. the 3D audio renderer 162) may be configured to render the destination audio signal of the audio source 311, 312, 313 from the destination source position on the destination sphere 114 around the destination listening position 302.

Hence, the virtual reality audio renderer 160 may comprise a pre-processing unit 161 which is configured to determine the destination source position and the destination audio signal of the audio source 311, 312, 313. Furthermore, the VR audio renderer 160 may comprise a 3D audio renderer 162 which is configured to render the destination audio signal of the audio source 311, 312, 313. The 3D audio renderer 162 may be configured to adapt the rendering of an audio signal of an audio source 311, 312, 313 on a (unit) sphere 114 around a listening position 301, 302 of a listener 181, subject to a rotational movement of a head of the listener 181 (to provide 3 DoF within a rendering environment 180). On the other hand, the 3D audio renderer 162 may not be configured to adapt the rendering of the audio signal of the audio source 311, 312, 313, subject to a translational movement of the head of the listener 181. Hence, the 3D audio renderer 162 may be limited to 3 DoFs. The translational DoFs may then be provided in an efficient manner using the pre-processing unit 161, thereby providing an overall VR audio renderer 160 having 6 DoFs.

Furthermore, an audio encoder 130 configured to generate a bitstream 140 is described. The bitstream 140 is generated such that the bitstream 140 is indicative of an audio signal of at least one audio source 311, 312, 313, and indicative of a position of the at least one audio source 311, 312, 313 within a rendering environment 180. In addition, the bitstream 140 may be indicative of environmental data 193 with regards to an audio propagation property of audio within the rendering environment 180. By signaling environmental data 193 regarding audio propagation properties, local transitions 192 within the rendering environment 180 may be enabled in a precise manner.

In addition, a bitstream 140 is described, which is indicative of an audio signal of at least one audio source 311, 312, 313; of a position of the at least one audio source 311, 312, 313 within a rendering environment 180; and of environmental data 193 indicative of an audio propagation property of audio within the rendering environment 180. Alternatively or in addition, the bitstream 140 may be indicative of whether or not the audio source 311, 312, 313 is an ambience audio source 801.

Figure 9D:
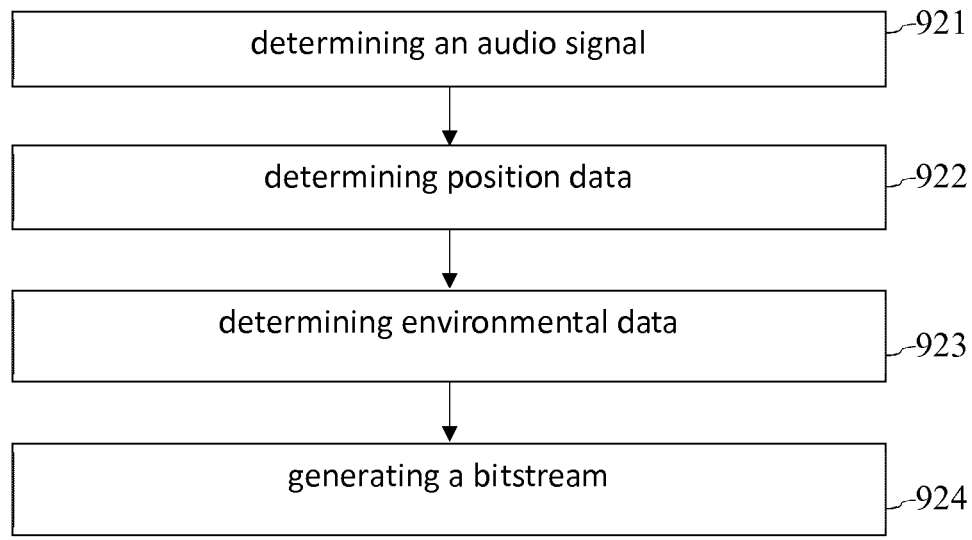
FIG. 9d shows a flow chart of an example method for generating a bitstream for local transitions.

FIG. 9*d* shows a flow chart of an example method 920 for generating a bitstream 140. The method 920 comprises determining 921 an audio signal of at least one audio source 311, 312, 313. Furthermore, the method 920 comprises determining 922 position data regarding a position of the at least one audio source 311, 312, 313 within a rendering environment 180. In addition, the method 920 may comprise determining 923 environmental data 193 indicative of an audio propagation property of audio within the rendering environment 180. The method 920 further comprises inserting 934 the audio signal, the position data and the environmental data 193 into the bitstream 140. Alternatively or in addition, in indication may be interested within the bitstream 140 of whether or not the audio source 311, 312, 313 is an ambience audio source 801.

Hence, in the present document a virtual reality audio renderer 160 (an a corresponding method) for rendering an audio signal in a virtual reality rendering environment 180 is described. The audio renderer 160 comprises a 3D audio renderer 162 which is configured to render an audio signal of an audio source 113, 311, 312, 313 from a source position on a sphere 114 around a listening position 301, 302 of a listener 181 within the virtual reality rendering environment 180. Furthermore, the virtual reality audio renderer 160 comprises a pre-processing unit 161 which is configured to determine a new listening position 301, 302 of the listener 181 within the virtual reality rendering environment 180 (within the same or within a different audio scene 111, 112). Furthermore, the pre-processing unit 161 is configured to update the audio signal and the source position of the audio source 113, 311, 312, 313 with respect to a sphere 114 around the new listening position 301, 302. The 3D audio renderer 162 is configured to render the updated audio signal of the audio source 311, 312, 313 from the updated source position on the sphere 114 around the new listening position 301, 302.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

Enumerated examples (EE) of the present document are:

EE 1) A method (900) for rendering audio in a virtual reality rendering environment (180), the method (900) comprising,
  rendering (901) an origin audio signal of an origin audio source (113) of an origin audio scene (111) from an origin source position on a sphere (114) around a listening position (201) of a listener (181);
  determining (902) that the listener (181) moves from the listening position (201) within the origin audio scene (111) to a listening position (202) within a different destination audio scene (112);
  applying (903) a fade-out gain to the origin audio signal to determine a modified origin audio signal; and
  rendering (904) the modified origin audio signal of the origin audio source (113) from the origin source position on the sphere (114) around the listening position (201, 202).

EE 2) The method (900) of EE 1, wherein the method (900) comprises,
  determining that the listener (181) moves from the origin audio scene (111) to the destination audio scene (112) during a transition time interval;
  determining an intermediate time instant (213) within the transition time interval; and
  determining the fade-out gain based on a relative location of the intermediate time instant (213) within the transition time interval.

EE 3) The method (900) of EE 2, wherein
  the method (900) comprises providing a fade-out function (211) which indicates the fade-out gain at different intermediate time instants (213) within the transition time interval; and
  the fade-out function (211) is such that the fade-out gain decreases with progressing intermediate time instants (213).

EE 4) The method (900) of EE 3, wherein the fade-out function (211) is such that
  the origin audio signal remains unmodified at a beginning of the transition time interval; and/or
  the origin audio signal is increasingly attenuated at progressing intermediate time instants (213); and/or
  the origin audio signal is fully attenuated at an end of the transition time interval.

EE 5) The method (900) of any previous EEs, wherein the method (900) comprises
  maintaining the origin source position of the origin audio source (113) on the sphere (114) around the listening position (201, 202) as the listener (181) moves from the origin audio scene (111) to the destination audio scene (112); and/or
  maintaining the listening position (201, 202) unchanged as the listener (181) moves from the origin audio scene (111) to the destination audio scene (112).

EE 6) The method (900) of any previous EEs, wherein the method (900) comprises
   determining a destination audio signal of a destination audio source (113) of the destination audio scene (112);
   determining a destination source position on the sphere (114) around the listening position (201, 202);
   applying a fade-in gain to the destination audio signal to determine a modified destination audio signal; and
   rendering the modified destination audio signal of the destination audio source (113) from the destination source position on the sphere (114) around the listening position (201, 202).

EE 7) The method (900) of EE 6, wherein the method (900) comprises,
   determining that the listener (181) moves from the origin audio scene (111) to the destination audio scene (112) during a transition time interval;
   determining an intermediate time instant (213) within the transition time interval; and
   determining the fade-in gain based on a relative location of the intermediate time instant (213) within the transition time interval.

EE 8) The method (900) of EE 7, wherein
   the method (900) comprises providing a fade-in function (212) which indicates the fade-in gain at different intermediate time instants (213) within the transition time interval; and
   the fade-in function (212) is such that the fade-in gain increases with progressing intermediate time instants (213).

EE 9) The method (900) of EE 8, wherein the fade-in function (212) is such that
   the destination audio signal remains unmodified at an end of the transition time interval; and/or
   the destination audio signal is decreasingly attenuated at progressing intermediate time instants (213); and/or
   the destination audio signal is fully attenuated at a beginning of the transition time interval.

EE 10) The method (900) of any of EEs 6 to 9, wherein the method (900) comprises
   maintaining the destination source position of the destination audio source (113) on the sphere (114) around the listening position (201, 202) as the listener (181) moves from the origin audio scene (111) to the destination audio scene (112); and
   maintaining the listening position (201, 202) unchanged as the listener (181) moves from the origin audio scene (111) to the destination audio scene (112).

EE 11) The method (900) of EE 8 referring back to EE 3, wherein the fade-out function (211) and the fade-in function (212) in combination provide a constant gain for a plurality of different intermediate time instants (213).

EE 12) The method (900) of EE 8 referring back to EE 3, wherein the fade-out function (211) and/or the fade-in function (212)
   are derived from a bitstream (140) which is indicative of the origin audio signal and/or the destination audio signal; and/or
   are derived from a storage unit of a virtual reality audio render (160) configured to render the origin audio signal and/or the destination audio signal within the virtual reality rendering environment (180).

EE 13) The method (900) of any previous EEs, wherein the method (900) comprises receiving an indication that the listener (181) moves from the origin audio scene (111) to the destination audio scene (112).

EE 14) The method (900) of EE 13, wherein the indication comprises a flag.

EE 15) The method (900) of any previous EEs, wherein the method (900) comprises sending an indication that the listener (181) moves from the origin audio scene (111) to the destination audio scene (112) to an encoder (130); wherein the encoder (130) is configured to generate a bitstream (140) which is indicative of the origin audio signal.

EE 16) The method (900) of any previous EEs, wherein the first audio signal is rendered using a 3D audio renderer (162)), notably an MPEG-H audio renderer.

EE 17) The method (900) of any previous EE, wherein the method (900) comprises,
   rendering a plurality of origin audio signals of a corresponding plurality of origin audio sources (113) from a plurality of different origin source positions on the sphere (114) around the listening position (201, 202);
   applying the fade-out gain to the plurality of origin audio signals to determine a plurality of modified origin audio signals; and
   rendering the plurality of modified origin audio signals of the origin audio source (113) from the corresponding plurality of origin source positions on the sphere (114) around the listening position (201, 202).

EE 18) The method (900) of any of EEs 6 to 17, wherein the method (900) comprises,
   determining a plurality of destination audio signals of a corresponding plurality of destination audio sources (113) of the destination audio scene (112);
   determining a plurality of destination source positions on the sphere (114) around the listening position (201, 202); and
   applying the fade-in gain to the plurality of destination audio signals to determine a corresponding plurality of modified destination audio signals; and
   rendering the plurality of modified destination audio signals of the plurality of destination audio sources (113) from the corresponding plurality of destination source positions on the sphere (114) around the listening position (201, 202).

EE 19) The method (900) of any previous EE, wherein the origin audio signal is an overlay of audio signals of a plurality of origin audio sources (113).

EE 20) A virtual reality audio renderer (160) for rendering audio in a virtual reality rendering environment (180), wherein the virtual reality audio renderer (160) is configured to
   render an origin audio signal of an origin audio source (113) of an origin audio scene (111) from an origin source position on a sphere (114) around a listening position (201) of a listener (181);
   determine that the listener (181) moves from the listening position (201) within the origin audio scene (111) to a listening position (202) within a different destination audio scene (112);
   apply a fade-out gain to the origin audio signal to determine a modified origin audio signal; and
   render the modified origin audio signal of the origin audio source (113) from the origin source position on the sphere (114) around the listening position (201, 202).

EE 21) An encoder (130) configured to generate a bitstream (140) indicative of an audio signal to be rendered within a virtual reality rendering environment (180); wherein the encoder (130) is configured to
   determine an origin audio signal of an origin audio source (113) of an origin audio scene (111);

determine origin position data regarding an origin source position of the origin audio source (113);
generate a bitstream (140) comprising the origin audio signal and the origin position data;
receive an indication that a listener (181) moves from the origin audio scene (111) to a destination audio scene (112) within the virtual reality rendering environment (180);
determine a destination audio signal of a destination audio source (113) of the destination audio scene (112);
determine destination position data regarding a destination source position of the destination audio source (113); and
generate a bitstream (140) comprising the destination audio signal and the destination position data.

EE 22) A method (930) for generating a bitstream (140) indicative of an audio signal to be rendered within a virtual reality rendering environment (180); the method (930) comprising,
determining (931) an origin audio signal of an origin audio source (113) of an origin audio scene (111);
determining (932) origin position data regarding an origin source position of the origin audio source (113);
generating (933) a bitstream (140) comprising the origin audio signal and the origin position data;
receiving (934) an indication that a listener (181) moves from the origin audio scene (111) to a destination audio scene (112) within the virtual reality rendering environment (180);
determining (935) a destination audio signal of a destination audio source (113) of the destination audio scene (112);
determining (936) destination position data regarding a destination source position of the destination audio source (113); and
generating (937) a bitstream (140) comprising the destination audio signal and the destination position data.

EE 23) A virtual reality audio renderer (160) for rendering an audio signal in a virtual reality rendering environment (180), wherein the audio renderer (160) comprises,
a 3D audio renderer (162) which is configured to render an audio signal of an audio source (113) from a source position on a sphere (114) around a listening position (201, 202) of a listener (181) within the virtual reality rendering environment (180);
a pre-processing unit (161) which is configured to
determine a new listening position (201, 202) of the listener (181) within the virtual reality rendering environment (180); and
update the audio signal and the source position of the audio source (201, 202) with respect to a sphere (114) around the new listening position (201, 202);
wherein the 3D audio renderer (162) is configured to render the updated audio signal of the audio source 113) from the updated source position on the sphere (114) around the new listening position (201, 202).

The invention claimed is:

1. A method for rendering audio in a virtual reality rendering environment using a 3DoF renderer, the method comprising,
rendering, by the 3DoF renderer, an origin audio signal of an origin audio source of an origin audio scene from an origin source position on a sphere around an origin listening position of a listener within a virtual reality rendering environment;
determining that the listener moves within the virtual reality rendering environment from the origin listening position within the origin audio scene to a destination listening position within a different destination audio scene;
responsive to the determination that the listener moves from the origin listening position within the origin audio scene to the destination listening position within the destination audio scene, applying a fade-out gain to the origin audio signal to determine a modified origin audio signal; and
rendering, by the 3DoF renderer, the modified origin audio signal of the origin audio source from the origin source position on the sphere around the origin listening position; wherein the method further comprises:
determining a destination audio signal of a destination audio source of the destination audio scene;
determining a destination source position on the sphere around the destination listening position;
applying a fade-in gain to the destination audio signal to determine a modified destination audio signal; and
rendering, by the 3DoF renderer, the modified destination audio signal of the destination audio source from the destination source position on the sphere around the destination listening position.

2. The method of claim 1, wherein the modified origin audio signal is rendered from the same position relative to the listener throughout the movement from the origin listening position within the origin audio scene to the destination listening position within the destination audio scene.

3. The method of claim 1, wherein the destination audio scene does not include the origin audio source.

4. The method of claim 1, wherein the method comprises,
determining that the listener moves from the origin audio scene to the destination audio scene during a transition time interval;
determining an intermediate time instant within the transition time interval; and
determining the fade-out gain based on a relative location of the intermediate time instant within the transition time interval.

5. The method of claim 4, wherein
a respective fade-out gain is determined for each of a plurality of intermediate time instants within the transition time interval based on the relative location of the respective intermediate time instant within the transition interval; and
the respective determined fade-out gain is applied to the origin audio signal to determine a respective modified origin audio signal for each of the plurality of intermediate time constants within the transition time interval.

6. The method of claim 1, wherein the fade-out gain is different from zero up until the destination listening position within the destination audio scene is reached.

7. The method of claim 4, wherein
the method comprises providing a fade-out function which indicates the fade-out gain at different intermediate time instants within the transition time interval; and
the fade-out function is such that the fade-out gain decreases with progressing intermediate time instants.

8. The method of claim 7, wherein the fade-out function is such that
the origin audio signal remains unmodified at a beginning of the transition time interval; and/or
the origin audio signal is increasingly attenuated at progressing intermediate time instants; and/or the origin audio signal is fully attenuated at an end of the transition time interval.

9. The method of claim 1, wherein the method comprises maintaining the origin source position of the origin audio source on the sphere around the origin listening position as the listener moves within the virtual reality rendering environment from the origin audio scene to the destination audio scene; and/or maintaining the origin listening position unchanged as the listener moves within the virtual reality rendering environment from the origin audio scene to the destination audio scene.

10. The method of claim 1, wherein the modified destination audio signal is rendered from the same position relative to the listener throughout the movement from the origin listening position within the origin audio scene to the destination listening position within the destination audio scene.

11. The method of claim 10, wherein the origin audio scene does not include the destination audio source.

12. The method of claim 1, wherein the method comprises,
determining that the listener moves from the origin audio scene to the destination audio scene during a transition time interval;
determining an intermediate time instant within the transition time interval; and
determining the fade-in gain based on a relative location of the intermediate time instant within the transition time interval.

13. The method of claim 12, wherein:
a respective fade-in gain is determined for each of a plurality of intermediate time instants within the transition time interval based on the relative location of the respective intermediate time instant within the transition interval; and
the respective determined fade-in gain is applied to the destination audio signal to determine a respective modified destination audio signal for each of the plurality of intermediate time constants within the transition time interval.

14. The method of claim 1, wherein the fade-in gain is different from zero during the movement from the origin audio scene to the destination audio scene.

15. The method of claim 12, wherein
the method comprises providing a fade-in function which indicates the fade-in gain at different intermediate time instants within the transition time interval; and
the fade-in function is such that the fade-in gain increases with progressing intermediate time instants.

16. The method of claim 15, wherein the fade-in function is such that
the destination audio signal remains unmodified at an end of the transition time interval; and/or
the destination audio signal is decreasingly attenuated at progressing intermediate time instants; and/or
the destination audio signal is fully attenuated at a beginning of the transition time interval.

17. The method of claim 1, wherein the method comprises maintaining the destination source position of the destination audio source on the sphere around the destination listening position as the listener moves within the virtual reality rendering environment from the origin audio scene to the destination audio scene; and/or
maintaining the destination listening position unchanged as the listener moves within the virtual reality rendering environment from the origin audio scene to the destination audio scene.

18. The method of claim 7, wherein
the method comprises providing a fade-in function which indicates the fade-in gain at different intermediate time instants within the transition time interval;
the fade-in function is such that the fade-in gain increases with progressing intermediate time instants; and
the fade-out function and the fade-in function in combination provide a constant gain for a plurality of different intermediate time instants.

19. The method of claim 7, wherein
the method comprises providing a fade-in function which indicates the fade-in gain at different intermediate time instants within the transition time interval;
the fade-in function is such that the fade-in gain increases with progressing intermediate time instants; and
the fade-out function and/or the fade-in function:
are derived from a bitstream which is indicative of the origin audio signal and/or the destination audio signal; and/or
are derived from a storage unit of a virtual reality audio render configured to render the origin audio signal and/or the destination audio signal within the virtual reality rendering environment.

20. The method of claim 1, wherein the method comprises receiving an indication that the listener moves from the origin audio scene to the destination audio scene.

21. The method of claim 20, wherein the indication comprises a flag.

22. The method of claim 1, wherein the method comprises sending an indication that the listener moves from the origin audio scene to the destination audio scene to an encoder; wherein the encoder is configured to generate a bitstream which is indicative of the origin audio signal.

* * * * *